(12) United States Patent
Lee et al.

(10) Patent No.: US 10,170,916 B2
(45) Date of Patent: Jan. 1, 2019

(54) ENERGY STORAGE DEVICE, POWER MANAGEMENT DEVICE, MOBILE TERMINAL AND METHOD FOR OPERATING THE SAME

(71) Applicant: LG ELECTRONICS INC., Seoul (KR)

(72) Inventors: Seungyong Lee, Seoul (KR); Jaehyuk Park, Seoul (KR); Heesoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 15/271,287

(22) Filed: Sep. 21, 2016

(65) Prior Publication Data
US 2017/0012441 A1 Jan. 12, 2017

Related U.S. Application Data

(62) Division of application No. 13/969,189, filed on Aug. 16, 2013, now Pat. No. 9,490,635.

(30) Foreign Application Priority Data

Aug. 17, 2012 (KR) .......................... 10-2012-0089961

(51) Int. Cl.
H02J 3/00 (2006.01)
H02J 4/00 (2006.01)
(Continued)

(52) U.S. Cl.
CPC ................ *H02J 4/00* (2013.01); *G08B 21/18* (2013.01); *H02J 1/10* (2013.01); *H02J 3/383* (2013.01);
(Continued)

(58) Field of Classification Search
CPC .... H02J 5/005; H02J 5/00; H02J 7/022; H02J 7/04; H02J 7/00; H02J 7/35; H02J 4/00; H02J 13/00; H02J 13/001
(Continued)

(56) References Cited

U.S. PATENT DOCUMENTS 4,383,211 A    5/1983  Staler
4,636,931 A    1/1987  Takahashi et al.
(Continued)

FOREIGN PATENT DOCUMENTS

DE    102010017264 A1    12/2011
EP        2346138 A2      7/2011
(Continued)

OTHER PUBLICATIONS

Nitta et al., "AMI System Forming Basis of Smart Grid—Advanced Metering Infrastructure for Smart Grid," Toshiba Review, Issue 65, No. 9, Sep. 1, 2010, pp. 20-22 (25 pages total), with an English translation.
(Continued)

*Primary Examiner* — Rexford Barnie
*Assistant Examiner* — Jagdeep Dhillon
(74) *Attorney, Agent, or Firm* — Birch, Stewart, Kolasch & Birch, LLP

(57) ABSTRACT

An energy storage device including at least one battery pack; a communication module configured to transmit power-on information or energy storage amount information to a power management device and to receive a charge command or discharge command from the power management device; a connector configured to receive alternating current (AC) power, supplied to an internal power network through a photovoltaic module, from the internal power network based on the charge command or to output AC power to the internal power network based on the discharge command;
(Continued)

and a power converter configured to, when the charge command is received from the power management device, convert the AC power from the internal power network into direct current (DC) power based on the charge command, or, when the discharge command is received from the power management device, convert DC power stored in the at least one battery pack into AC power based on the discharge command.

9 Claims, 23 Drawing Sheets

(51) Int. Cl.
| | |
|---|---|
| H04B 5/00 | (2006.01) |
| G08B 21/18 | (2006.01) |
| H02J 3/38 | (2006.01) |
| H02J 7/35 | (2006.01) |
| H02J 13/00 | (2006.01) |
| H02J 1/10 | (2006.01) |
| H02J 5/00 | (2016.01) |
| H02J 7/02 | (2016.01) |
| H02J 3/14 | (2006.01) |
| H02J 3/32 | (2006.01) |
| H04W 76/10 | (2018.01) |

(52) U.S. Cl.
CPC ............. *H02J 5/00* (2013.01); *H02J 7/022* (2013.01); *H02J 7/35* (2013.01); *H02J 13/001* (2013.01); *H02J 13/0075* (2013.01); *H04B 5/0031* (2013.01); *H02J 3/14* (2013.01); *H02J 3/32* (2013.01); *H02J 13/0062* (2013.01); *H02J 2003/143* (2013.01); *H04W 76/10* (2018.02); *Y02B 70/3266* (2013.01); *Y02B 90/222* (2013.01); *Y02B 90/2638* (2013.01); *Y02B 90/2653* (2013.01); *Y02D 70/00* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/42* (2018.01); *Y02E 10/563* (2013.01); *Y02E 10/566* (2013.01); *Y02E 40/72* (2013.01); *Y04S 10/123* (2013.01); *Y04S 10/40* (2013.01); *Y04S 20/12* (2013.01); *Y04S 20/242* (2013.01); *Y04S 40/124* (2013.01); *Y04S 40/126* (2013.01); *Y10T 307/367* (2015.04)

(58) Field of Classification Search
USPC ........ 307/26, 66, 64, 9.1, 10.1, 82; 320/134, 320/132, 128, 130; 340/636.19, 636.21; 324/430, 432; 701/22, 21, 20; 903/903, 903/930
See application file for complete search history.

(56) References Cited

U.S. PATENT DOCUMENTS

| | | | |
|---|---|---|---|
| 5,751,133 A | 5/1998 | Sato et al. | |
| 9,065,296 B2 | 6/2015 | Shim | |
| 9,269,989 B2 | 2/2016 | Nakashima et al. | |
| 9,478,990 B2* | 10/2016 | Moon | ...................... H02J 3/32 |
| 2003/0202344 A1 | 10/2003 | Kenny et al. | |
| 2004/0066094 A1 | 4/2004 | Suzuki et al. | |
| 2006/0132294 A1* | 6/2006 | Spark | ................. B60R 25/1003 340/426.1 |
| 2008/0040223 A1 | 2/2008 | Bridges et al. | |
| 2008/0167756 A1 | 7/2008 | Golden et al. | |
| 2009/0102424 A1* | 4/2009 | Tien | ..................... H02J 7/0022 320/124 |
| 2010/0076825 A1 | 3/2010 | Sato et al. | |
| 2010/0138066 A1 | 6/2010 | Kong | |
| 2011/0074356 A1 | 3/2011 | Yamazaki et al. | |
| 2011/0078092 A1 | 3/2011 | Kim et al. | |
| 2011/0107123 A1 | 5/2011 | Nishimura et al. | |
| 2011/0133556 A1 | 6/2011 | Choi | |
| 2011/0153098 A1 | 6/2011 | Tomita et al. | |
| 2011/0204720 A1* | 8/2011 | Ruiz | ................... B60L 11/1816 307/66 |
| 2011/0208378 A1* | 8/2011 | Krueger | ................ B60W 10/06 701/22 |
| 2011/0291479 A1 | 12/2011 | Lee | |
| 2012/0056588 A1 | 3/2012 | Cai et al. | |
| 2012/0161523 A1 | 6/2012 | Kim et al. | |
| 2012/0161709 A1 | 6/2012 | Fujii et al. | |
| 2012/0209463 A1* | 8/2012 | Gibbs | ...................... B60K 6/46 701/22 |
| 2012/0212183 A1 | 8/2012 | Yamada et al. | |
| 2012/0228941 A1 | 9/2012 | Sakai | |
| 2012/0228943 A1 | 9/2012 | Nakashima et al. | |
| 2012/0235491 A1 | 9/2012 | Nakashima et al. | |
| 2012/0263151 A1 | 10/2012 | Terry et al. | |
| 2012/0274395 A1* | 11/2012 | Deam | ..................... H02M 1/08 327/538 |
| 2013/0006458 A1* | 1/2013 | Bhattarai | ............ B60W 50/082 701/22 |
| 2013/0063094 A1* | 3/2013 | Gibbs | ................ G01R 31/3624 320/134 |
| 2013/0127626 A1* | 5/2013 | Yoo | ..................... G01R 31/3689 340/636.19 |
| 2013/0169231 A1 | 7/2013 | Hotta | |
| 2013/0190939 A1 | 7/2013 | Lenox | |
| 2013/0229057 A1 | 9/2013 | Taima | |
| 2013/0234654 A1 | 9/2013 | Tsuchiya et al. | |
| 2014/0351010 A1 | 11/2014 | Kong | |

FOREIGN PATENT DOCUMENTS

| | | |
|---|---|---|
| JP | 3-190538 A | 8/1991 |
| JP | 9-163626 A | 6/1997 |
| JP | 10-14128 A | 1/1998 |
| JP | 2000-4545 A | 1/2000 |
| JP | 2008-43170 A | 2/2008 |
| JP | 2008-182851 A | 8/2008 |
| JP | 2009-302030 A | 12/2009 |
| JP | 2011-185662 A | 9/2011 |
| JP | 2011-254696 A | 12/2011 |
| JP | 2012-100429 A | 5/2012 |
| WO | WO 2009/157342 A1 | 12/2009 |
| WO | WO 2012/036086 A1 | 3/2012 |
| WO | WO 2012/066915 A1 | 5/2012 |

OTHER PUBLICATIONS

Guo et al., DERWENT Database, DERWENT Week 201012, Thomson Reuters, DERWENT Acc. No. 2010-B21602, Jan. 20, 2010, 3 pages.

Jiang et al., DERWENT Database, DERWENT Week 201140, Thomson Reuters, DERWENT Acc. No. 2011-F91317, Apr. 27, 2011, 3 pages.

\* cited by examiner

ENERGY STORAGE DEVICE, POWER MANAGEMENT DEVICE, MOBILE TERMINAL AND METHOD FOR OPERATING THE SAME

CROSS-REFERENCE TO RELATED APPLICATION

This application is a Divisional of copending U.S. application Ser. No. 13/969,189, filed on Aug. 16, 2013, which claims priority under 35 U.S.C. § 119(a) to Application No. 10-2012-0089961, filed in the Republic of Korea on Aug. 17, 2012, all of which are hereby expressly incorporated by reference into the present application.

BACKGROUND OF THE INVENTION

1. Field of the Invention

The embodiments of the present invention relate to an energy storage device, a power management device, a mobile terminal and a method for operating the same, and more particularly to an energy storage device which is capable of efficiently storing energy, a power management device, a mobile terminal, and a method for operating the same.

2. Description of the Related Art

Recently, as existing energy resources such as petroleum and coal are expected to be depleted, interest in alternative energy resources is increasing. In this regard, concern about new and renewable energy using sunlight, wind power, small-scale hydraulic power, etc., has also increased.

There is a need to supply or store energy for such new and renewable energy and therefore to use an energy storage device for storing the energy.

SUMMARY OF THE INVENTION

It is an object of the embodiments of the present invention to provide an energy storage device which is capable of efficiently storing energy, a power management device, a mobile terminal, and a method for operating the same.

In accordance with an aspect of the present invention, the above and other objects can be accomplished by the provision of an energy storage device including at least one battery pack, a communication module configured to transmit power-on information or energy storage amount information to a power management device and to receive a charge command or discharge command from the power management device, a connector configured to receive alternating current (AC) power, supplied to an internal power network through a photovoltaic module, from the internal power network based on the charge command or to output AC power to the internal power network based on the discharge command, and a power converter configured to, when the charge command is received from the power management device, convert the AC power from the internal power network into direct current (DC) power based on the charge command, or, when the discharge command is received from the power management device, convert DC power stored in the at least one battery pack into AC power based on the discharge command.

In accordance with another aspect of the present invention, there is provided a power management device including a communication module configured to receive information about solar power generated by a photovoltaic module, information about commercial power supplied to an internal power network, information about load power consumed in the internal power network, and information about an energy storage amount of at least one energy storage device, and a processor configured to generate a charge command for charging of alternating current (AC) power from the internal power network to the at least one energy storage device or a discharge command for discharging of AC power from the energy storage device to the internal power network based on at least one of the load power information, the commercial power information, the solar power information and the energy storage amount information, wherein the communication module transmits the generated charge command or discharge command to the at least one energy storage device.

In accordance with another aspect of the present invention, there is provided a mobile terminal including a display, a wireless communication unit to exchange data with a power management device, and a controller for, when a power monitoring mode for an internal power network is entered, performing a control operation to transmit a power monitoring request to the power management device, and, when monitored information for power information in the internal power network is received from the power management device, performing a control operation to display the monitored information on the display.

In accordance with another aspect of the present invention, there is provided a method for operating an energy storage device, the method including converting alternating current (AC) power from an internal power network into direct current (DC) power based on a charge command when the charge command is received from a power management device, storing the converted DC power in a battery pack, converting the DC power stored in the battery pack into AC power based on a discharge command when the discharge command is received from the power management device, and outputting the converted AC power to the internal power network.

In accordance with another aspect of the present invention, there is provided a method for operating a power management device, the method including receiving information about solar power generated by a photovoltaic module and then supplied to an internal power network, receiving information about load power consumed in the internal power network and information about commercial power supplied to the internal power network, generating a charge command for charging of alternating current (AC) power from the internal power network to at least one energy storage device or a discharge command for discharging of AC power from the energy storage device to the internal power network based on at least one of the load power information, the commercial power information, the solar power information and information about an energy storage amount of the energy storage device, and transmitting the generated charge command or discharge command to the energy storage device.

In accordance with a further aspect of the present invention, there is provided a method for operating a mobile terminal, the method including entering a power monitoring mode for an internal power network, transmitting a power monitoring request to a power management device in the power monitoring mode, receiving monitored information for power information in the internal power network from the power management device, and displaying the monitored information on a display.

BRIEF DESCRIPTION OF THE DRAWINGS

The above and other objects, features and other advantages of the embodiments of the present invention will be more clearly understood from the following detailed description taken in conjunction with the accompanying drawings, in which.

DETAILED DESCRIPTION OF THE EMBODIMENTS

Reference will now be made in detail to the example embodiments of the present invention, examples of which are illustrated in the accompanying drawings. Wherever possible, the same reference numbers will be used throughout the drawings to refer to the same or like parts.

It is to be noted that the suffixes of constituent elements used in the following description, such as "module" and "unit", are simply used considering the ease of writing this specification and do not have any particular importance or role. Accordingly, the terms "module" and "unit" may be used interchangeably.

Figure 1:
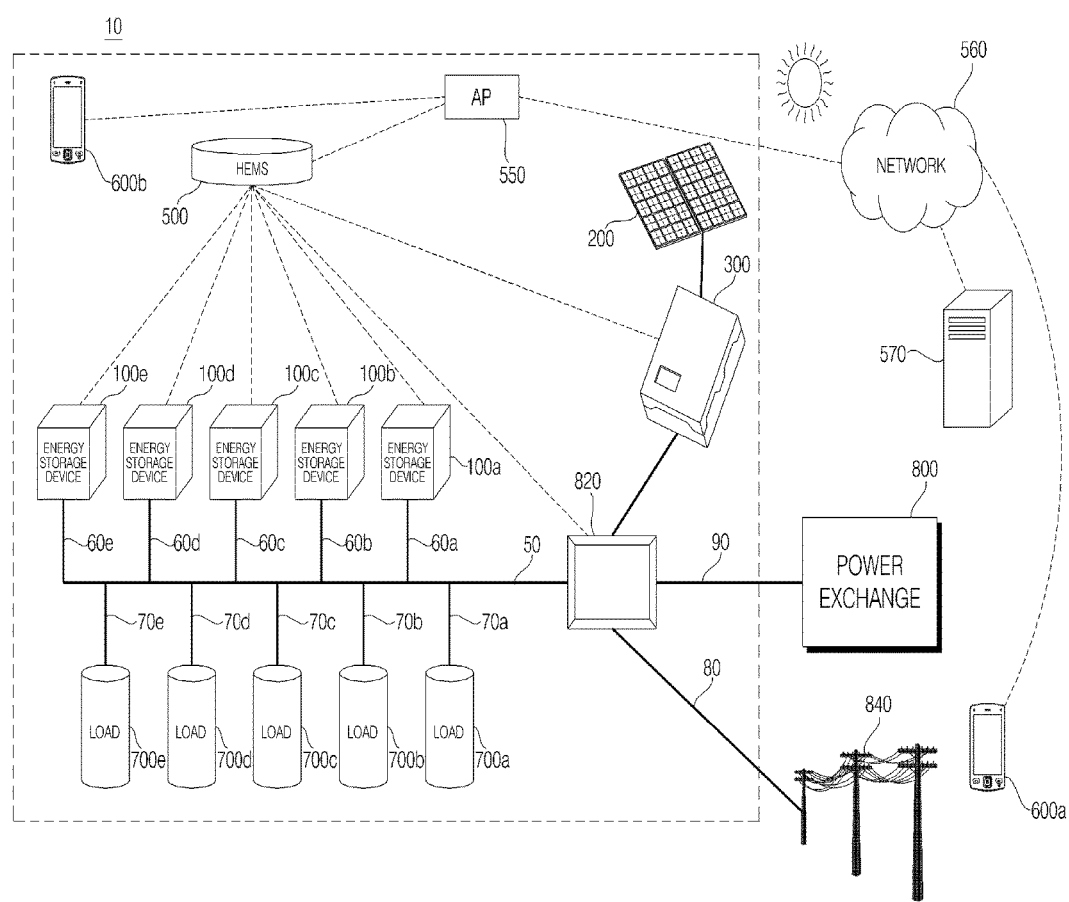
FIG. 1 is a schematic view showing the configuration of a power supply system according to an embodiment of the present invention.

FIG. 1 is a schematic view showing the configuration of a power supply system according to an embodiment of the present invention.

Referring to FIG. 1, the power supply system according to an embodiment of the present embodiment, denoted by reference numeral 10, may supply solar power generated by a photovoltaic module 200, commercial power from a commercial power plant 840, etc., to an internal power network 50 through a power distributor 820.

Also, the power supply system 10 may supply some of powers stored in a plurality of energy storage devices 100a, 100b, . . . , 100e to a power exchange 800 through the power distributor 820.

In this power supply system 10, new and renewable powers generated by a variety of new and renewable energy devices, besides the photovoltaic module 200 shown in FIG. 1, may be supplied to the internal power network 50 through the power distributor 820.

On the other hand, the power supply system 10 according to the present embodiment may supply power into a building, but is not limited thereto and may be subjected to a variety of extensions. For example, the power supply system 10 may supply power to each home in a collective building or may supply power to each of a plurality of buildings in a certain region. The following description will be mainly given on the assumption that the power supply system 10 supplies power into a single building.

In this regard, the power supply system 10 of FIG. 1 may include the internal power network 50, the plurality of energy storage devices 100a, 100b, . . . , 100e, the photovoltaic module 200, a junction box 300 for performing conversion of power from the photovoltaic module 200, a power management device 500, a network router 550, and the power distributor 820.

In FIG. 1, a plurality of loads 700a, 700b, . . . , 700e are illustrated as being electrically connected to the internal power network 50 through respective connection terminals 70a, 70b, . . . , 70e connected to the internal power network 50.

Also, the energy storage devices 100a, 100b, . . . , 100e are illustrated as being electrically connected to the internal power network 50 through respective connection terminals 60a, 60b, . . . , 60e connected to the internal power network 50.

When the energy storage devices 100a, 100b, . . . , 100e operate in a charge mode, each of them may receive alternating current (AC) power from the internal power network 50, convert the received AC power into direct current (DC) power and store the converted DC power in a battery pack provided therein.

Also, when the energy storage devices 100a, 100b, . . . , 100e operate in a discharge mode, each of them may convert DC power stored in the battery pack into AC power and supply the converted AC power to the internal power network 50.

On the other hand, when the supply of commercial AC power to the internal power network 50 is interrupted, namely, when a power failure occurs, the energy storage devices 100a, 100b, . . . , 100e may operate in the discharge mode. As a result, DC power stored in each of the energy storage devices 100a, 100b, . . . , 100e may be converted into AC power and then supplied to the internal power network 50. Therefore, each of the loads 700a, 700b, . . . , 700e electrically connected to the internal power network 50 may be stably supplied with AC power even in the event of a power failure.

On the other hand, the internal configuration and operation of each of the energy storage devices 100a, 100b, . . . , 100e will be described later in detail with reference to FIGS. 6 and 9.

In the present embodiment, the charge mode or discharge mode of each of the energy storage devices 100a, 100b, . . . , 100e is performed based on a charge command or discharge command from the power management device 500.

The power management device 500 is capable of managing power in the internal power network 50, and may be called a home energy management system (HEMS).

To this end, the power management device 500 may perform wireless data communication with each of the energy storage devices 100a, 100b, . . . , 100e. For example, wireless data communication may be performed between the power management device 500 and each of the energy storage devices 100a, 100b, . . . , 100e in a ZigBee communication scheme.

On the other hand, a WiFi scheme, besides the ZigBee communication scheme, may be applied to wireless data communication between the power management device 500 and each of the energy storage devices 100a, 100b, . . . , 100e. Alternatively, wireless Bluetooth, Radio Frequency Identification (RFID), Infrared Data Association (IrDA), Ultra Wideband (UWB) and Radio Frequency (RF) schemes may be applied. The following description will be mainly given on the assumption that the ZigBee communication scheme is applied to wireless data communication between the power management device 500 and each of the energy storage devices 100a, 100b, . . . , 100e.

The power management device 500 may receive power-on information or energy storage amount information from each of the energy storage devices 100a, 100b, . . . , 100e, and transmit a charge command or discharge command to each of the energy storage devices 100a, 100b, . . . , 100e.

Also, the power management device 500 may perform wireless data communication with the junction box 300. For example, wireless data communication may be performed between the power management device 500 and the junction box 300 in the ZigBee communication scheme. Of course, communication schemes, such as the WiFi scheme, other than the ZigBee communication scheme, may be used. The following description will be mainly given on the assumption that the ZigBee communication scheme is applied to wireless data communication between the power management device 500 and the junction box 300.

On the other hand, the power management device 500 may receive, from the junction box 300, information about solar power generated by the photovoltaic module 200 and then converted by the junction box 300.

Also, the power management device 500 may perform wireless data communication with the power distributor 820. For example, wireless data communication may be performed between the power management device 500 and the power distributor 820 in the ZigBee communication scheme. Of course, communication schemes, such as the WiFi scheme, other than the ZigBee communication scheme, may be used. The following description will be mainly given on the assumption that the ZigBee communication scheme is applied to wireless data communication between the power management device 500 and the power distributor 820.

On the other hand, the power management device 500 may receive, from the power distributor 820, information about commercial power supplied from the commercial power plant 840 to the internal power network 50 and information about load power consumed in the internal power network 50.

Also, the power management device 500 may perform wireless data communication with each of the loads 700a, 700b, . . . , 700e electrically connected to the internal power network 50. For example, wireless data communication may be performed between the power management device 500 and each of the loads 700a, 700b, . . . , 700e in the ZigBee communication scheme. Of course, communication schemes, such as the WiFi scheme, other than the ZigBee communication scheme, may be used. The following description will be mainly given on the assumption that the ZigBee communication scheme is applied to wireless data communication between the power management device 500 and each of the loads 700a, 700b, . . . , 700e.

On the other hand, the power management device 500 may receive the information about the load power consumed in the internal power network 50 from the loads 700a, 700b, . . . , 700e.

Although the information about the load power consumed in the internal power network 50 may be transmitted from the power distributor 820 or the loads 700a, 700b, . . . , 700e to the power management device 500 as stated above, the following description will be mainly given on the assumption that the information about the load power consumed in the internal power network 50 is transmitted from the power distributor 820 to the power management device 500.

The power management device 500 may perform wireless data communication with powered-on ones of the energy storage devices 100a, 100b, . . . , 100e.

To this end, first, the power management device 500 may receive a pairing request signal, which is power-on information, from a powered-on energy storage device and transmit a pairing response signal including a radio channel allocation signal, etc., to the powered-on energy storage device in response to the received pairing request signal. Then, when pairing with the powered-on energy storage device is completed, the power management device 500 may perform wireless data communication with the powered-on energy storage device over an allocated radio channel.

On the other hand, for control of charge mode and discharge mode operations of each of the energy storage devices 100a, 100b, . . . , 100e, the power management device 500 may receive information about solar power generated by the photovoltaic module 200, information about commercial power supplied to the internal power network 50, information about load power consumed in the internal power network 50, and information about an energy storage amount of each of the energy storage devices 100a, 100b, . . . , 100e.

For example, the power management device 500 may receive the information about the solar power generated by the photovoltaic module 200 from the junction box 300 through ZigBee communication. Also, the power management device 500 may receive the information about the commercial power supplied to the internal power network 50 and the information about the load power consumed in the internal power network from the power distributor 820 through ZigBee communication. Also, the power management device 500 may receive the information about the energy storage amount of each of the energy storage devices 100a, 100b, . . . , 100e from a corresponding one of the energy storage devices 100a, 100b, . . . , 100e through ZigBee communication. Here, the energy storage amount information may include information about power stored in a battery pack or information about power additionally storable in the battery pack.

The power management device 500 may determine that at least one of the energy storage devices 100a, 100b, . . . , 100e will operate in the charge mode, based on at least one of the solar power information, the commercial power information, the load power information and the energy storage amount information, and generate a charge command according to the determined charge mode.

Also, the power management device 500 may determine that at least one of the energy storage devices 100a, 100b, . . . , 100e will operate in the discharge mode, based on at least one of the solar power information, the commercial power information, the load power information and the energy storage amount information, and generate a discharge command according to the determined discharge mode.

Also, when the supply of commercial AC power to the internal power network 50 is interrupted, namely, when a power failure occurs, the power management device 500 may receive information about the power failure from the power distributor 820, and thus determine that at least one of the energy storage devices 100a, 100b, . . . , 100e will operate in the discharge mode and generate a discharge command according to the determined discharge mode.

Then, the power management device 500 may transmit the charge command or discharge command to the at least one energy storage device through ZigBee communication.

On the other hand, the power management device 500 may perform data communication with an external server 570 through the network router 550, etc.

For example, the external server 570 may provide information about the price of commercial power, peak time power supply/demand information, etc. The external server 570 may receive such information from the power exchange 800 or commercial power plant 840 and transmit the received information to the power management device 500 over an external network 560.

As a result, the power management device 500 may receive the commercial power price information, the peak time power supply/demand information, etc., and generate the discharge command or charge command in further consideration of the received information in the above discharge command generation or charge command generation.

On the other hand, the commercial power price information and the peak time power supply/demand information may be received from the power exchange 800 or commercial power plant 840, besides the external server 570.

On the other hand, the network router 550 may exchange data with the power management device 500 and the external network 560 to enable the power management device 500 to be connected with the external network 560.

For example, the network router 550 may provide an internal network for the internal power network 50 with the power management device 500 which manages power in the internal power network 50. In particular, the network router 550 may be a wireless network router which is capable of performing wireless data communication. In this regard, the network router 550 may be called an access point (AP).

On the other hand, the network router 550 may allocate radio channels to electronic devices in the internal network and perform wireless data communications with the electronic devices over the corresponding channels. For example, the network router 550 may perform wireless data communication with a mobile terminal 600*b* located in the internal network in the WiFi scheme.

Therefore, the mobile terminal 600*b* located in the internal network may exchange data with the power management device 500, and perform power information monitoring, remote control for power management, etc., through connection with the power management device 500.

On the other hand, the network router 550 may perform data communication with an external electronic device over the external network 560, besides the internal network. For example, the network router 550 may perform wireless data communication with a mobile terminal 600*a* located outside of the internal network. In this instance, the network router 550 may be a network access server (NAS).

Therefore, the mobile terminal 600*a* located outside of the internal network may exchange data with the power management device 500, and perform power information monitoring, remote control for power management, etc., through connection with the power management device 500.

The photovoltaic module 200 converts sunlight into DC power and outputs the converted DC power. To this end, the photovoltaic module 200 may include a plurality of solar cells. Also, the photovoltaic module 200 may further include a first sealing member disposed on the bottom of the solar cells, a second sealing member disposed on the top of the solar cells, a rear substrate disposed on the lower surface of the first sealing member, and a front substrate disposed on the upper surface of the second sealing member.

Each solar cell is a semiconductor device which converts solar energy into electrical energy, and may be a silicon solar cell, a compound semiconductor solar cell, a tandem solar cell, a fuel sensitive solar cell, a CdTe solar cell or a CIGS solar cell.

The solar cells may be electrically connected in series, in parallel or in series-parallel.

The junction box 300 receives DC power from the photovoltaic module 200, converts the received DC power into AC power and outputs the converted AC power. To this end, the junction box 300 may include a bypass diode, a DC/DC converter, a smoothing capacitor, and an inverter.

Besides, the junction box 300 may further include a communication module for communication with the power management device 500. In detail, the junction box 300 may transmit, to the power management device 500, information about solar power generated by the photovoltaic module 200 and then converted by the junction box 300. Also, the junction box 300 may receive solar power adjustment information from the power management device 500 and adjust solar power to be output based on the received solar power adjustment information.

On the other hand, in FIG. 1, solar power output from the junction box 300 is illustrated as being supplied to the internal power network 50 via the power distributor 820.

On the other hand, although the junction box 300 is shown in FIG. 1 as being separate from the photovoltaic module 200, it may be integrally attached on the rear surface of the photovoltaic module 200, alternatively.

Figure 2:
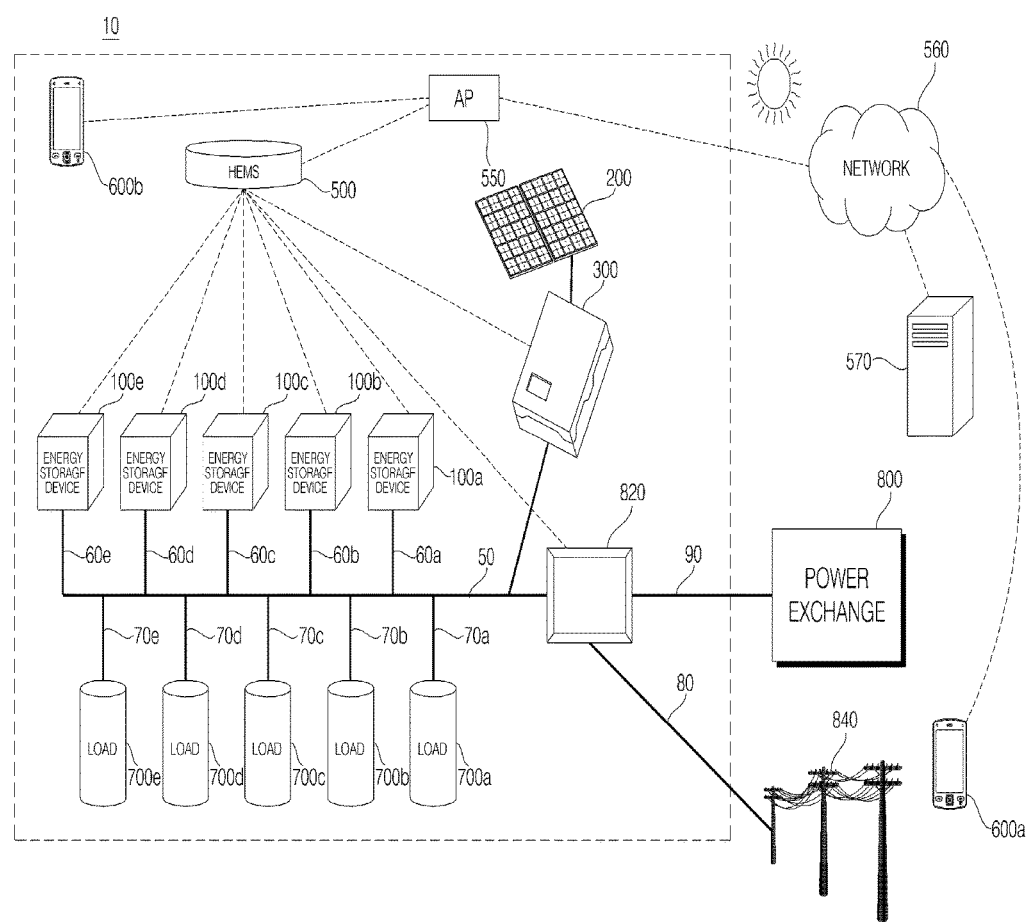
FIG. 2 is a schematic view showing the configuration of a power supply system according to another embodiment of the present invention.

FIG. 2 is a schematic view showing the configuration of a power supply system according to another embodiment of the present invention.

The power supply system of FIG. 2, denoted by reference numeral 10, is substantially the same in configuration as the power supply system 10 of FIG. 1, with the exception that the solar power output from the junction box 300 is directly supplied to the internal power network 50, not via the power distributor 820.

Figure 3A:
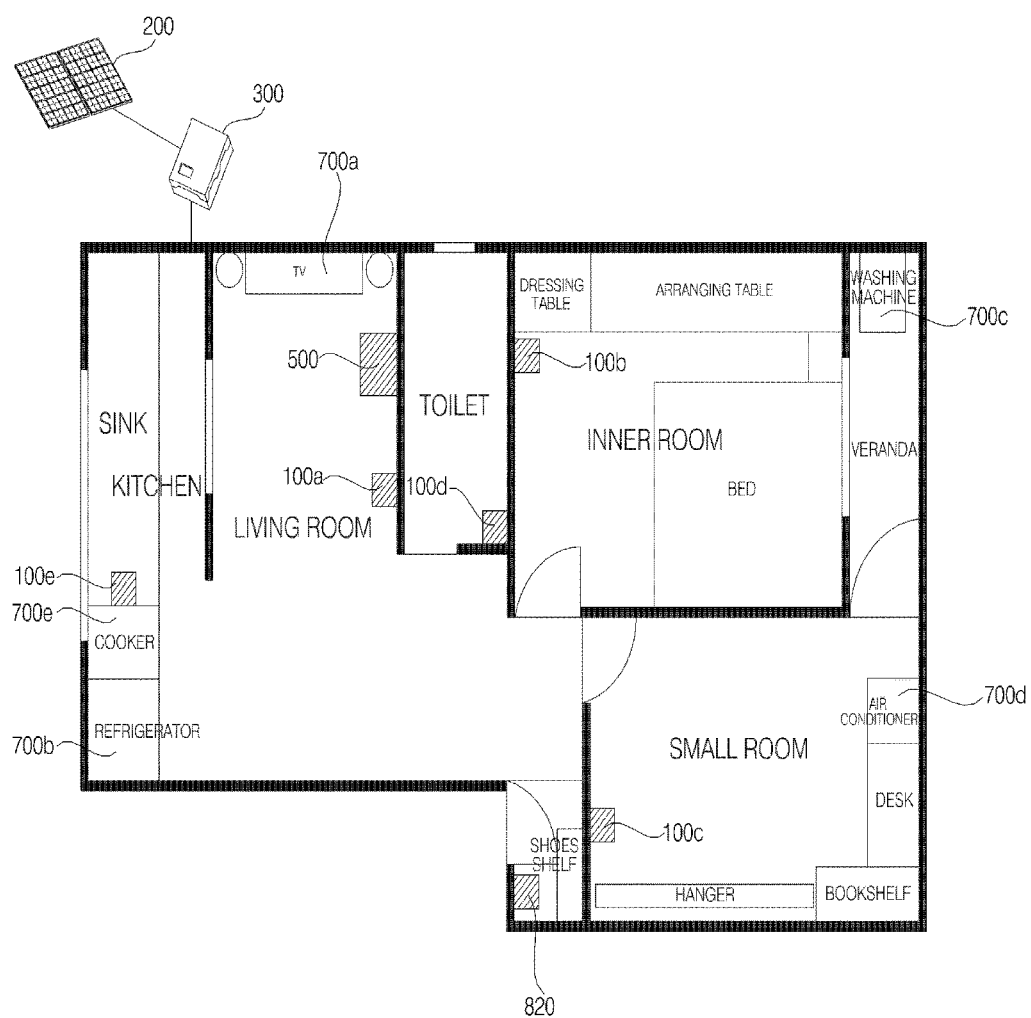
FIGS. 3A and 3B are plan views showing various examples of an arrangement of respective devices in the power supply system of FIG. 1.
Figure 3B:
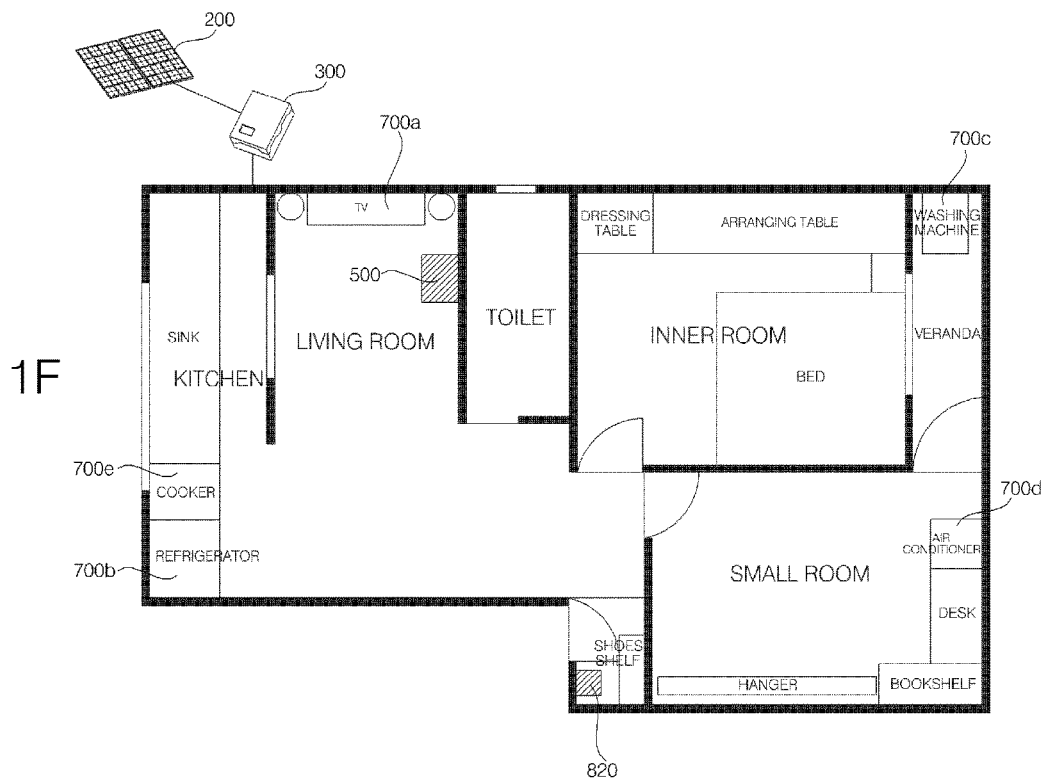
Figure 3B:
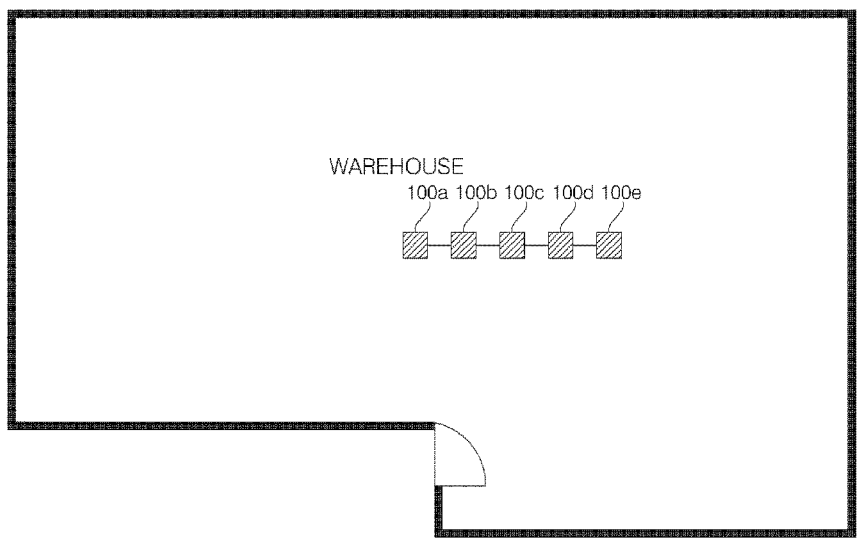

FIGS. 3A and 3B are plan views showing various examples of an arrangement of respective devices in the power supply system of FIG. 1.

FIG. 3A shows one example of the arrangement of the respective devices in the power supply system of FIG. 1. Referring to FIG. 3A, the power management device 500, among the respective devices in the power supply system 10, may be disposed in a living room. Also, the first energy storage device 100*a* may be disposed in the living room, the second energy storage device 100*b* in an inner room, the third energy storage device 100*c* in a small room, the fourth energy storage device 100*d* in a toilet, and the fifth energy storage device 100*e* in a kitchen, respectively.

These energy storage devices 100*a*, 100*b*, . . . , 100*e* may be electrically connected to the internal power network 50 through the respective connection terminals 60*a*, 60*b*, . . . , 60*e*, as stated previously with reference to FIG. 1.

On the other hand, a television (TV), which is the first load 700*a*, may be disposed in the living room, a refrigerator, which is the second load 700*b*, in the kitchen, a washing machine, which is the third load 700*c*, in a veranda, an air conditioner, which is the fourth load 700*d*, in the small room, and a cooker, which is the fifth load 700*e*, in the kitchen, respectively.

These loads 700*a*, 700*b*, . . . , 700*e* may be electrically connected to the internal power network 50 through the respective connection terminals 70*a*, 70*b*, . . . , 70*e*, as stated previously with reference to FIG. 1.

On the other hand, the power distributor 820 may be disposed around the gate of an entrance, the photovoltaic module 200 may be disposed at the roof of a building, and the junction box 300 may be disposed in the vicinity of the power distributor 820, for example, outside of the building.

On the other hand, the power management device 500 disposed in the living room may perform wireless data communication with each of the energy storage devices 100a, 100b, ..., 100e through ZigBee communication. Also, the power management device 500 may perform wireless data communication with each of the loads 700a, 700b, ..., 700e through ZigBee communication. Also, the power management device 500 may perform wireless data communication with the power distributor 820 or junction box 300 through ZigBee communication.

FIG. 3B shows another example of the arrangement of the respective devices in the power supply system of FIG. 1. Referring to FIG. 3B, the photovoltaic module 200, junction box 300, power management device 500, loads 700a, 700b, 700e and power distributor 820, among the respective devices of FIG. 3B, may be disposed at the same positions as in FIG. 3A. That is, the photovoltaic module 200, junction box 300, power management device 500, loads 700a, 700b, ..., 700e and power distributor 820 may be disposed on the first floor.

On the other hand, the energy storage devices 100a, 100b, ..., 100e may be separately disposed on a different floor. For example, the energy storage devices 100a, 100b, ..., 100e may be disposed in a basement B1, as shown in FIG. 3B. In this instance, provided that the energy storage devices 100a, 100b, ..., 100e have pluggable sockets, respectively, as will be described below, they may be connected in series as shown in FIG. 3B. This arrangement of the energy storage devices 100a, 100b, ..., 100e on a separate floor enables the use of the energy storage devices 100a, 100b, ..., 100e without spatial restrictions.

Figure 4A:
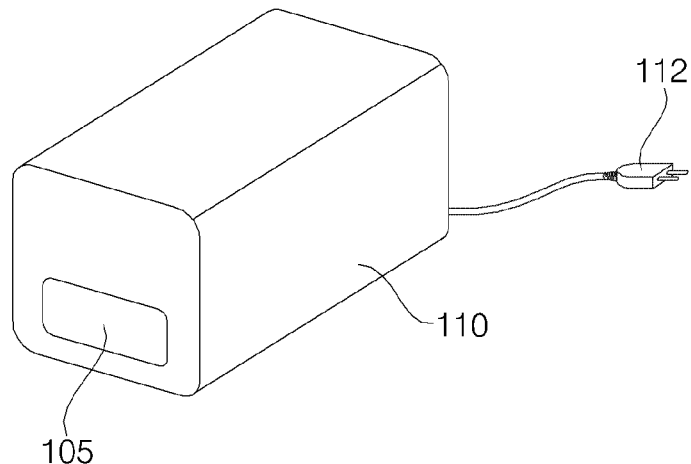
FIGS. 4A and 4B are perspective views showing various embodiments of an energy storage device in FIG. 1.
Figure 4B:
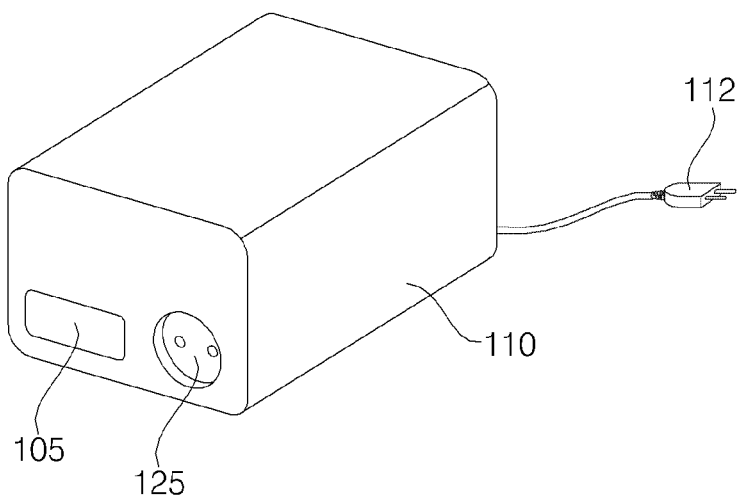

FIGS. 4A and 4B are perspective views showing various embodiments of each energy storage device in FIG. 1.

Referring to FIG. 4A, each energy storage device, collectively denoted by reference numeral 100, may include a plug 112 connectable to a socket for electrical connection with the internal power network 50, and a display unit 105 for displaying a power-on state when the energy storage device 100 is powered on or displaying an energy storage amount, etc., of the energy storage device 100. The display unit 105 enables the user to immediately know the energy storage amount.

Referring to FIG. 4B, the energy storage device 100 of FIG. 4B is substantially the same as that of FIG. 4A, with the exception that it further includes a socket 125 connectable with the plug 112. This configuration enables electrical connections among energy storage devices.

The socket 125 is connectable with the plug of a different energy storage device. When the plug of the different energy storage device is electrically connected to the socket 125, storable DC power may be increased. That is, the storage capacity of DC power storable in the energy storage device 100 may be changed.

Figure 5:
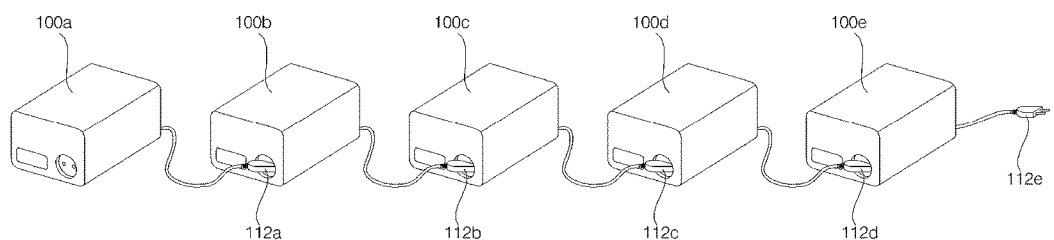
FIG. 5 is a perspective view showing a connection of the energy storage device of FIG. 4B.

FIG. 5 is a perspective view showing a connection of the energy storage device of FIG. 4B.

Referring to FIG. 5, the energy storage devices 100a, 100b, ..., 100e may be electrically connected in series. In detail, the plug 112a of the first energy storage device 100a may be connected to the socket 125b of the second energy storage device 100b, and the plug 112b of the second energy storage device 100b may be connected to the socket 125c of the third energy storage device 100c. In this manner, the energy storage devices 100a, 100b, ..., 100e may be electrically connected in series. This series connection may correspond to the connection state of the energy storage devices 100a, 100b, ..., 100e in FIG. 3B.

The electrical connections among the energy storage devices 100a, 100b, ..., 100e enable electrical connections among battery packs provided respectively in the energy storage devices 100a, 100b, ..., 100e, thereby expanding the storage capacity of DC power storable in each energy storage device.

Figure 6:
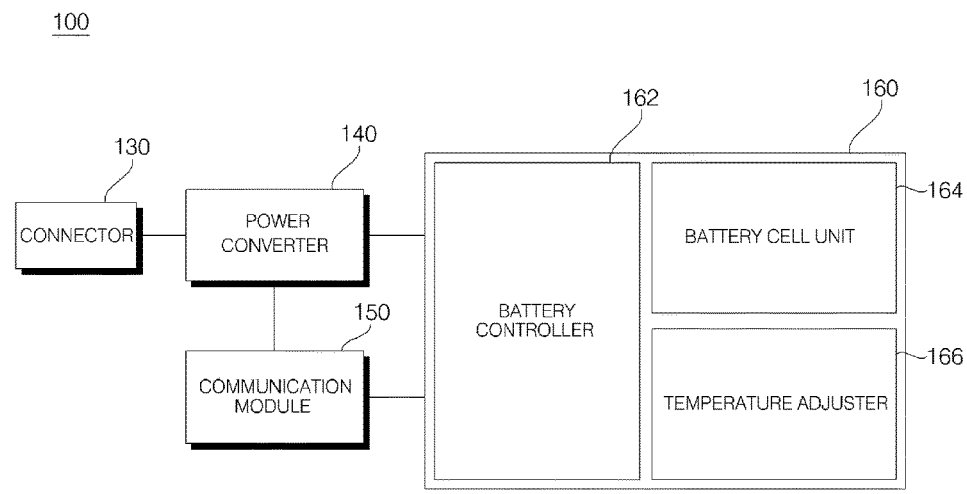
FIG. 6 is a block diagram of the energy storage device in FIG. 1.

FIG. 6 is a block diagram of each energy storage device in FIG. 1.

Referring to FIG. 6, the energy storage device 100 may include a connector 130, a power converter 140, a communication module 150, and a built-in battery pack 160.

The connector 130 may include only AC power terminals. According to the present embodiment, the energy storage device 100 may receive AC power, supplied to the internal power network 50 through the photovoltaic module 200, based on a charge command from the power management device 500, or output AC power to the internal power network based on a discharge command from the power management device 500. In this regard, DC power terminals are not needed and only AC power terminals are provided.

The power converter 140, upon receiving the charge command from the power management device 500, may receive AC power from the internal power network 50 and convert the received AC power into DC power, based on the received charge command. Then, the converted DC power may be transferred to the battery pack 160.

The power converter 140, upon receiving the discharge command from the power management device 500, may convert DC power stored in the battery pack 160 into AC power based on the received discharge command. Then, the converted AC power may be transferred to the above-stated internal power network 50 via the connector 130.

To this end, the power converter 140 may include a bidirectional AC/DC converter which receives AC power from the internal power network 50 and converts the received AC power into DC power, or converts DC power stored in the battery pack 160 into AC power based on the discharge command.

The communication module 150 performs data communication with the power management device 500. For example, the communication module 150 may transmit power-on information or energy storage amount information to the power management device 500 and receive the charge command or discharge command from the power management device 500. Although a variety of communication schemes may be used as described above, the ZigBee communication scheme, among them, will be used for wireless data communication in the present embodiment.

On the other hand, when the energy storage device 100 is powered on, the communication module 150 may transmit a pairing request signal as power-on information to the power management device 500. Then, the communication module 150 may receive a pairing response signal including information about a radio channel allocated by the power management device 500 from the power management device 500. As a result, the communication module 150 may perform wireless data communication with the power management device 500 over a radio channel different from that of another energy storage device.

On the other hand, after pairing is completed, the communication module 150 may receive the charge command or discharge command from the power management device 500. Also, after paring completion, the communication module 150 may transmit information about the amount of energy stored in the battery pack 160 to the power management device 500.

On the other hand, the communication module 150 may control the power converter 140 and the battery pack 160.

As an example, when the charge command is received, the communication module 150 may control the power converter 140 to convert AC power from the internal power network 50 into DC power. Then, the communication module 150 may control the battery pack 160 to store the converted DC power in the battery pack 160.

As another example, when the discharge command is received, the communication module 150 may control the battery pack 160 to transfer DC power stored in the battery pack 160 to the power converter 140. Then, the communication module 150 may control the power converter 140 to convert the DC power transferred to the power converter 140 into AC power.

That is, the communication module 150 may control the battery pack 160 such that it operates in the charge mode or discharge mode.

On the other hand, the battery pack 160 may include a battery pack case, and a battery controller 162, a battery cell unit 164 and a temperature adjuster 166 provided in the battery pack case.

The battery cell unit 164 includes a plurality of battery cells. These battery cells may be connected in series, in parallel or in series-parallel combination.

The temperature adjuster 166 adjusts the temperature of the battery cell unit 164. To this end, the temperature adjuster 166 may include temperature sensing means or device to sense the temperature of the battery cell unit 164. On the other hand, the temperature adjuster 166 may further include fan driving means or device to drive a fan based on the sensed temperature so as to lower the temperature of the battery cell unit 164. In order to improve efficiency of the temperature adjustment, the fan driving means or device is preferably disposed in an area corresponding to an area in which all the battery cells are arranged.

The battery controller 162 performs the overall control of the battery pack 160. For example, when the temperature of the battery cell unit 164 rises over a predetermined temperature, the battery controller 162 may control the temperature adjuster 166 to lower the temperature of the battery cell unit 164.

As another example, the battery controller 162 may balance DC powers stored respectively in the battery cells in the battery cell unit 164. That is, the battery controller 162 may detect the DC powers stored respectively in the battery cells and balance the DC powers based on a result of the detection.

On the other hand, the battery controller 162 may transfer status information (a temperature, the level of power stored, etc.) of the battery pack 160 to the communication module 150. Also, the battery controller 162 may receive status information (the level of power needed, etc.) of the energy storage device 100 from the communication module 150.

Figure 7:
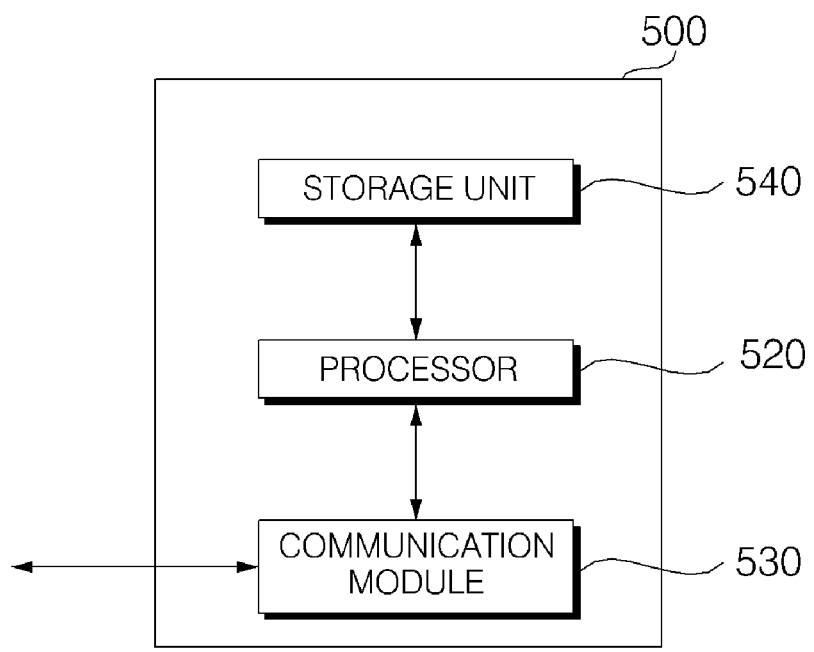
FIG. 7 is a block diagram of a power management device in FIG. 1.

FIG. 7 is a block diagram of the power management device in FIG. 1.

Referring to FIG. 7, the power management device 500 is a power management device for the internal power network 50, and may include a communication module 530, a storage unit 540, and a processor 520.

The communication module 530 in the power management device 500 may wirelessly exchange data with respective devices in the power supply system 10, for example, the energy storage devices 100a, 100b, . . . , 100e, the junction box 300 and the loads 700a, 700b, . . . , 700e in the ZigBee communication scheme. To this end, the communication module 530 may include a ZigBee communication module.

In detail, the communication module 530 may receive power-on information or energy storage amount information from each of the energy storage devices 100a, 100b, . . . , 100e and transmit a charge command or discharge command to each of the energy storage devices 100a, 100b, . . . , 100e.

The communication module 530 may receive a pairing request signal from a powered-on one of the energy storage devices 100a, 100b, . . . , 100e and transmit a pairing response signal generated by the processor 520 to the powered-on energy storage device in response to the received pairing request signal. The pairing response signal may include a radio channel allocation signal.

The communication module 530 may receive, from the junction box 300, information about solar power generated by the photovoltaic module 200 and then converted by the junction box 300.

The communication module 530 may receive, from the power distributor 820, information about commercial power supplied from the commercial power plant 840 to the internal power network 50 and information about load power consumed in the internal power network 50.

On the other hand, when the supply of commercial AC power to the internal power network 50 is interrupted, namely, when a power failure occurs, the communication module 530 may receive information about the power failure from the power distributor 820.

The communication module 530 may receive the information about the load power consumed in the internal power network 50 from the loads 700a, 700b, . . . , 700e.

On the other hand, the communication module 530 may exchange wireless data with the network router 550. For example, the communication module 530 may exchange the wireless data in the WiFi scheme. To this end, the communication module 530 may include a WiFi module.

By exchanging the wireless data with the network router 550, the communication module 530 may exchange data with the mobile terminal 600b connected to the internal network or exchange data with the mobile terminal 600a connected to the external network 560.

On the other hand, the processor 520 controls the entire operation of the power management device 500. In particular, the power management device 500 may communicate with the energy storage devices 100a, 100b, . . . , 100e to control the energy storage devices 100a, 100b, . . . , 100e such that they operate in the charge mode or discharge mode.

For example, the processor 520 may determine that at least one of the energy storage devices 100a, 100b, 100e will operate in the charge mode, based on at least one of the received solar power information, commercial power information, load power information and energy storage amount information, and calculate power to be charged in the at least one energy storage device in the charge mode. Then, the processor 520 may generate a corresponding charge command.

Also, the processor 520 may determine that at least one of the energy storage devices 100a, 100b, . . . , 100e will operate in the discharge mode, based on at least one of the received solar power information, commercial power information, load power information and energy storage amount information, and calculate power to be discharged from the at least one energy storage device to the internal power network in the discharge mode. Then, the processor 520 may generate a corresponding discharge command.

On the other hand, when the supply of commercial AC power to the internal power network 50 is interrupted, namely, when a power failure occurs, the processor 520 may determine that at least one of the energy storage devices 100a, 100b, . . . , 100e will operate in the discharge mode, and generate a discharge command according to the determined discharge mode.

The processor 520 may monitor power information of at least one of the loads 700a, 700b, . . . , 700e electrically connected to the internal power network 50 or at least one of the energy storage devices 100a, 100b, . . . , 100e electrically connected to the internal power network 50 based on the load power information received from the power distributor 820 or the energy storage amount information received from each of the energy storage devices 100a, 100b, . . . , 100e. That is, the processor 520 may monitor real-time power information.

The storage unit 540 may store radio channel information for allocation of different radio channels to the energy storage devices 100a, 100b, . . . , 100e. The radio channel information may include radio channel names, frequency ranges, security information, etc. Also, the storage unit 540 may store device names (device types, device serial numbers, . . . ), etc., of respective devices wirelessly connected through the power management device 500.

On the other hand, the storage unit 540 may store information about a radio channel with the network router 550. The radio channel information may include a radio channel name, a frequency range, security information, etc.

Figure 8:
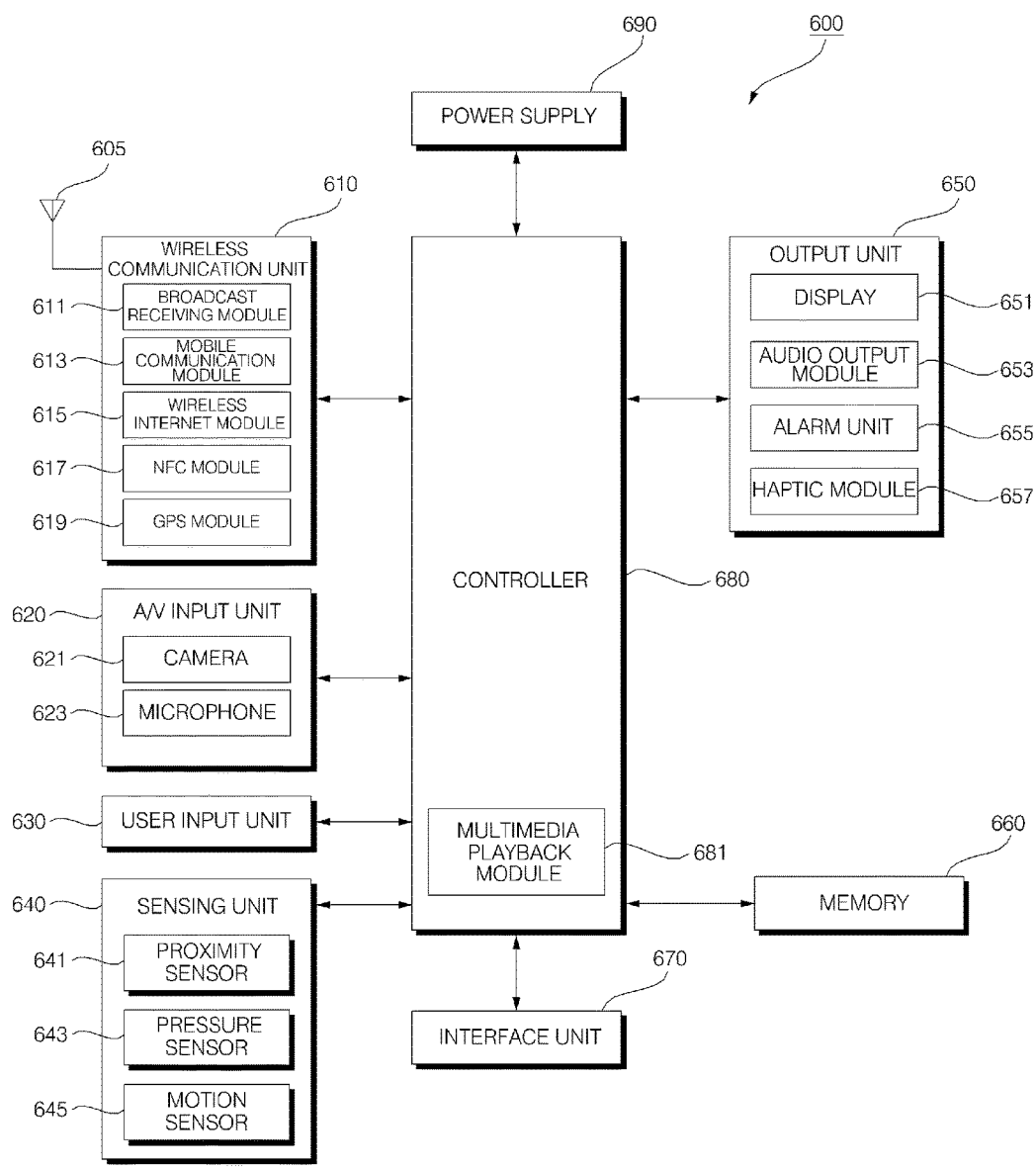
FIG. 8 is a block diagram of a mobile terminal in FIG. 1.

FIG. 8 is a block diagram of each mobile terminal in FIG. 1.

Referring to FIG. 8, each mobile terminal, collectively denoted by reference numeral 600, may include a wireless communication unit 610, an audio/video (A/V) input unit 620, a user input unit 630, a sensing unit 640, an output unit 650, a memory 660, an interface unit 670, a controller 680, and a power supply 690.

The wireless communication unit 610 according to the present embodiment may wirelessly exchange data with the power management unit 500 through the network router 550. As an example, when the mobile terminal 600 is in a power monitoring mode for the internal power network 50, the wireless communication unit 610 may transmit a power monitoring request and receive monitored information as a result of the power monitoring request. As another example, when the mobile terminal 600 is in a remote control mode for the internal power network 50, the wireless communication unit 610 may transmit a remote control signal. Also, the wireless communication unit 610 may receive remote control result information.

On the other hand, the wireless communication unit 610 may include a broadcast receiving module 611, a mobile communication module 613, a wireless Internet module 615, a near field communication (NFC) module 617, and a global positioning system (GPS) module 619.

The broadcast receiving module 611 may receive at least one of a broadcast signal and broadcast-related information from an external broadcast management server over a broadcast channel. Here, the broadcast channel may include a satellite channel and a terrestrial channel.

The broadcast signal and/or broadcast-related information received through the broadcast receiving module 611 may be stored in the memory 660.

The mobile communication module 613 transmits/receives radio signals to/from at least one of a base station, an external terminal and a server over a mobile communication network. Here, the radio signals may include a voice call signal, a video telephony call signal or various forms of data associated with text/multimedia message transmission/reception.

The wireless Internet module 615 refers to a module for wireless Internet access. This module 615 may be installed inside or outside of the mobile terminal 600. For example, the wireless Internet module 615 may perform WiFi-based wireless communication or WiFi Direct-based wireless communication.

The NFC module 617 performs near field communication (NFC). When the mobile terminal 600 approaches an electronic device equipped with an NFC tag or NFC module within a predetermined distance, namely, when the mobile terminal 600 tags the electronic device, the NFC module 617 may receive data from the electronic device or transmit data to the electronic device.

Such local area communication technologies may include Bluetooth, Radio Frequency Identification (RFID), Infrared Data Association (IrDA), Ultra Wideband (UWB), and Zig-Bee.

The GPS module 619 may receive location information from a plurality of GPS satellites.

The A/V input unit 620 is provided to input an audio signal or video signal. The A/V input unit 620 may include a camera 621 and a microphone 623.

The user input unit 630 generates key input data that the user inputs to control the operation of the terminal. To this end, the user input unit 630 may include a key pad, a dome switch, and a touch pad (static pressure/capacitance). In particular, the touch pad and a display 651 to be described later may form a layered structure, which may be called a touch screen.

The sensing unit 640 may sense the current state of the mobile terminal 600, such as the open/closed state of the mobile terminal 600, the location of the mobile terminal 600 or the presence or absence of user contact with the mobile terminal 600, and generate a sense signal for control of the operation of the mobile terminal 600 as a result of the sensing.

The sensing unit 640 may include a proximity sensor 641, a pressure sensor 643, and a motion sensor 645. The motion sensor 645 may sense the motion or position of the mobile terminal 600 using an acceleration sensor, a gyro sensor and a gravity. sensor. In particular, the gyro sensor is a sensor which measures an angular velocity, and may sense a direction (angle) in which the mobile terminal 600 is turned relative to a reference direction.

The output unit 650 may include the display 651, an audio output module 653, an alarm unit 655, and a haptic module 657.

The display 651 displays and outputs information processed in the mobile terminal 600.

On the other hand, in the instance where the display 651 and the touch pad form a layered structure to constitute a touch screen, as stated above, the display 651 may be used as an input device through which information can be input by user touch, as well as an output device.

The audio output module 653 outputs audio data received from the wireless communication unit 610 or stored in the memory 660. This audio output module 653 may include a speaker and a buzzer.

The alarm unit 655 outputs a signal to notify the user of occurrence of an event in the mobile terminal 600. For example, such a signal may be output in the form of a vibration.

The haptic module 657 generates a variety of haptic effects which can be felt by the user. A representative example of the haptic effects generated by the haptic module 657 may be a vibration effect.

The memory 660 may store programs for the processing and control of the controller 680 and may also function to temporarily store input/output data (for example, a phonebook, messages, still images, and moving images).

The interface unit 670 acts to interface with all external devices connected to the mobile terminal 600. The interface unit 670 may receive data transmitted from such an external device or power supplied therefrom and transfer the received data or power to each internal component of the mobile terminal 600, or transmit internal data of the mobile terminal 600 to the external device.

The controller 680 typically controls the operation of each of the above-stated components of the mobile terminal 600, so as to control the overall operation of the mobile terminal 600. For example, the controller 680 may perform control and processing associated with a voice call, data communication, and a video call. Also, the controller 680 may include a multimedia playback module 681 for multimedia playback. The multimedia playback module 681 may be configured by hardware in the controller 680 or by software separately from the controller 680.

The power supply 690, under the control of the controller 680, receives external power or internal power and supplies power necessary for the operation of each component of the mobile terminal 600.

On the other hand, the block diagram of the mobile terminal 600 shown in FIG. 8 is for one embodiment of the present invention. The respective components of the block diagram may be combined, added or omitted according to specifications of the mobile terminal 600 which is actually implemented. In other words, as needed, two or more of these components may be combined into one component or one thereof may be subdivided into two or more components. Also, the function performed by each block is intended for description of the present embodiment, and the detailed operation or device thereof does not limit the scope of the present invention.

Figure 9:
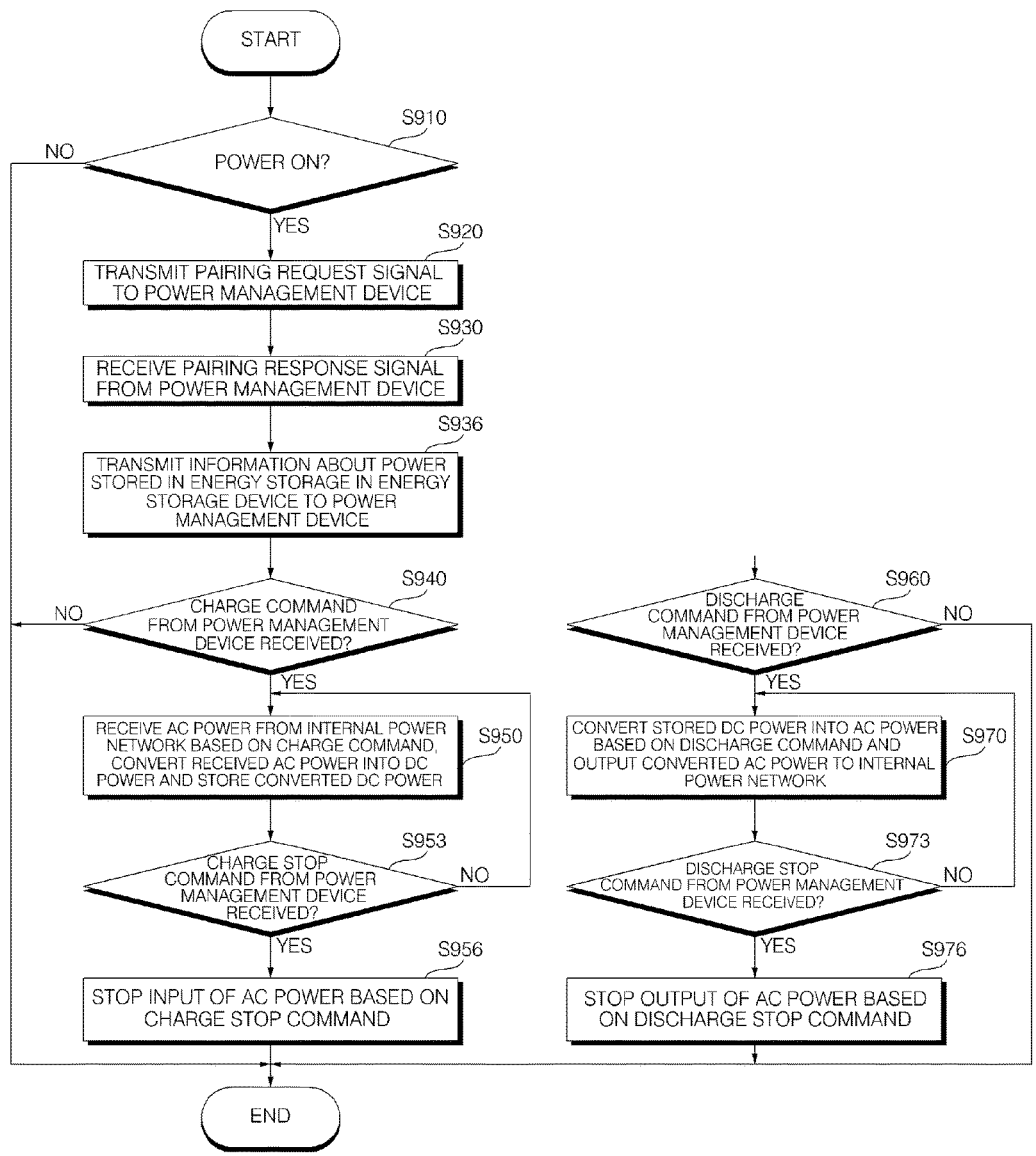
FIG. 9 is a flowchart illustrating a method for operating an energy storage device according to an embodiment of the present invention.
Figure 10:
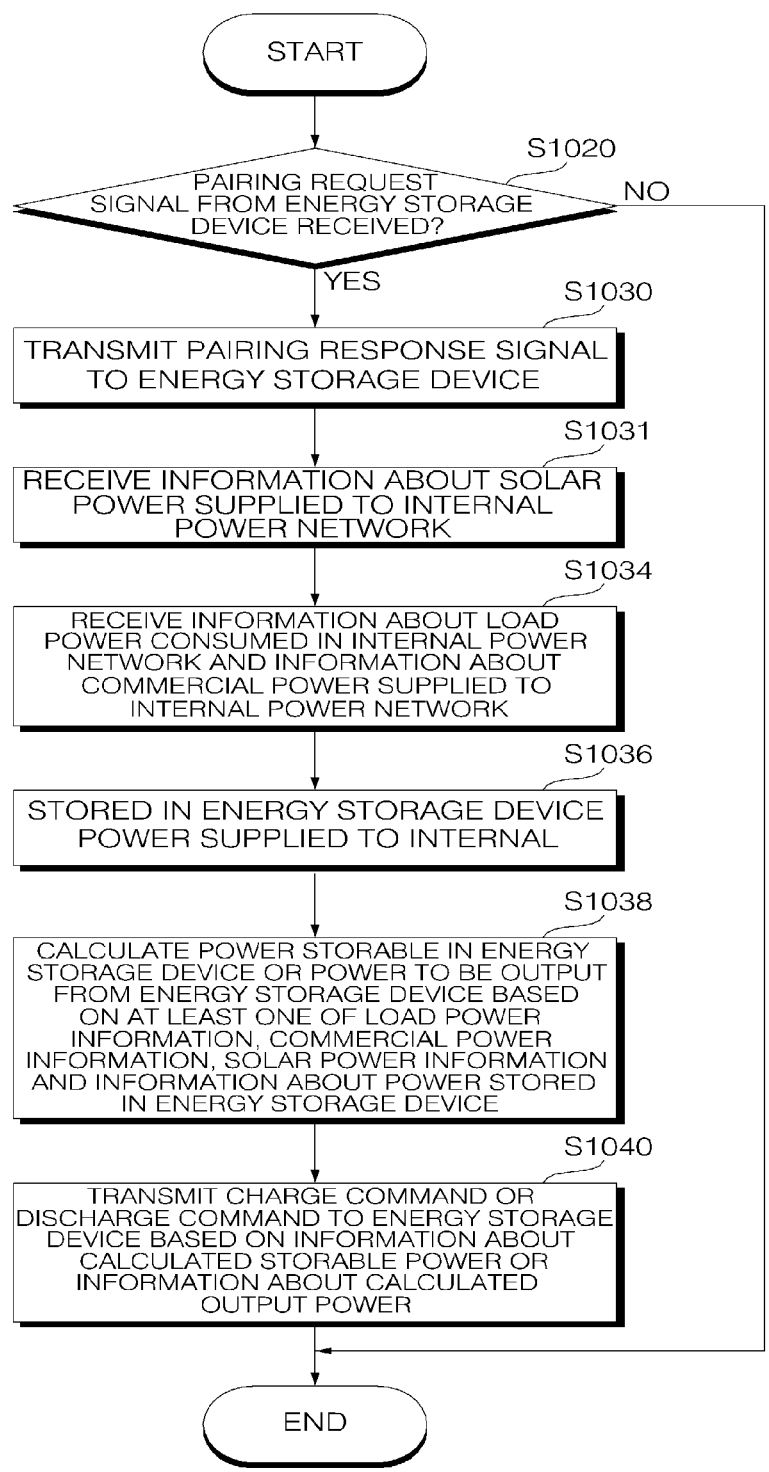
FIG. 10 is a flowchart illustrating a method for operating a power management device according to an embodiment of the present invention.

FIG. 9 is a flowchart illustrating a method for operating an energy storage device according to an embodiment of the present invention, FIG. 10 is a flowchart illustrating a method for operating a power management device according to an embodiment of the present invention, and FIGS. 11 to 17 are views referred to for description of the operating method of FIG. 9 or 10.

Referring to FIGS. 9 to 17, the energy storage device 100 determines whether it has been powered on (S910). If the energy storage device 100 has been powered on, it transmits a pairing request signal as power-on information to the power management device 500 (S920). Then, the energy storage device 100 receives a pairing response signal from the power management device 500 (S930).

Figure 12A:
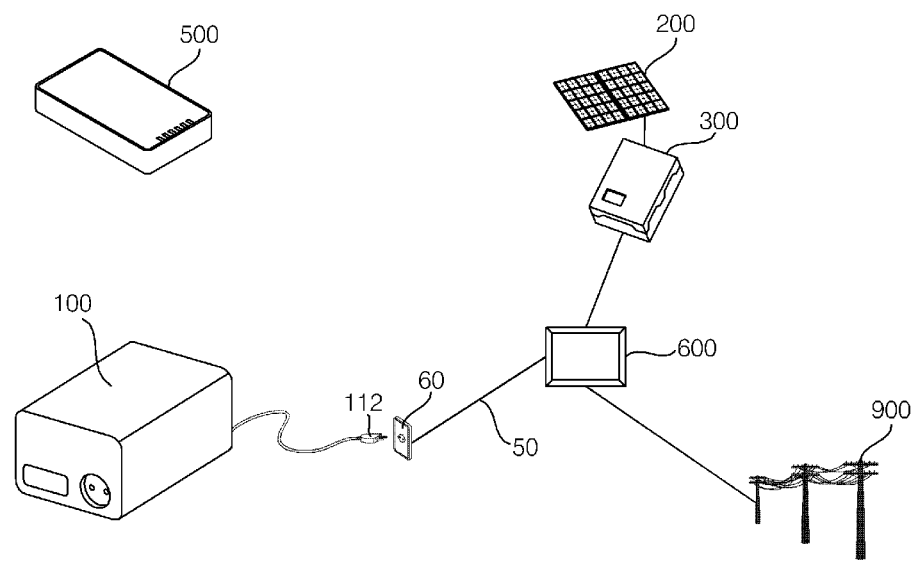

FIG. 12A illustrates a state in which the plug 112 of the energy storage device 100 is not connected to a socket 60.

Figure 12B:
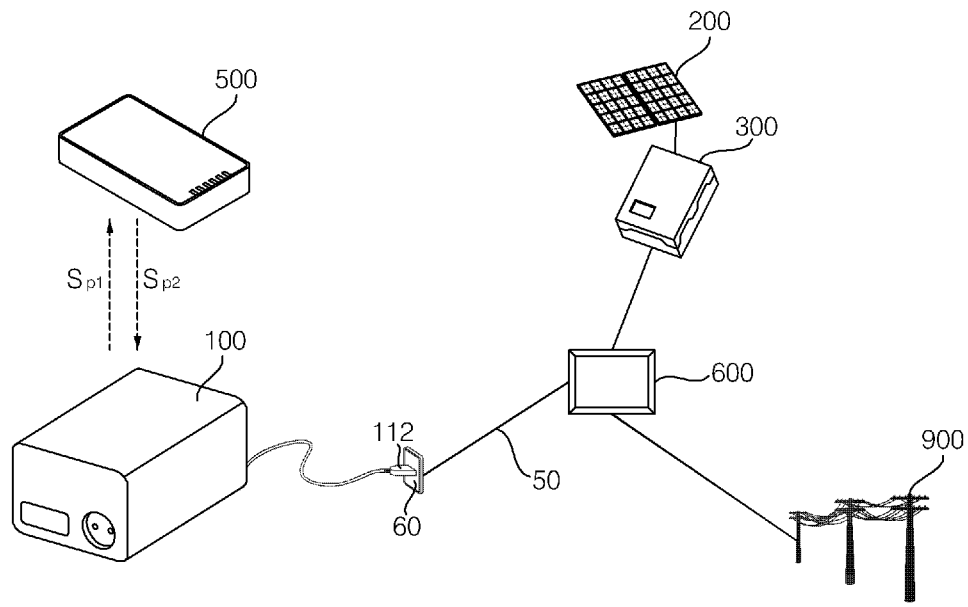

FIG. 12B illustrates a state in which the plug 112 of the energy storage device 100 is connected to the socket 60.

In the energy storage device 100, AC power supplied from the internal power network 50 may be input through the connector 130 and then converted into DC power by the power converter 140.

The converted DC power may be supplied as operating power to each module of the energy storage device 100. As a result, when the operating power is input, the communication module 150 may determine that the energy storage device 100 has been powered on, and then transmit the pairing request signal, which indicates that the energy storage device 100 has been powered on, to the power management device 500.

Then, the power management device 500 determines whether the pairing request signal has been received (S1020), and transmits the pairing response signal to the corresponding energy storage device 100 upon determining that the pairing request signal has been received (S1030).

In the power management device 500, the communication module 530 transfers the pairing request signal received from the energy storage device 100 to the processor 520. Then, the processor 520 generates the pairing response signal, which includes information about a radio channel allocated to the corresponding energy storage device 100, in response to the pairing request signal, and then controls the power management device 500 to transmit the generated pairing response signal to the energy storage device 100 through the communication module 530.

On the other hand, FIG. 12B also illustrates that the pairing request signal, denoted by Sp1, is transmitted from the energy storage device 100 to the power management device 500 and the pairing response signal, denoted by Sp2, is transmitted from the power management device 500 to the energy storage device 100, in the state in which the plug 112 of the energy storage device 100 is connected to the socket 60.

Figure 11:
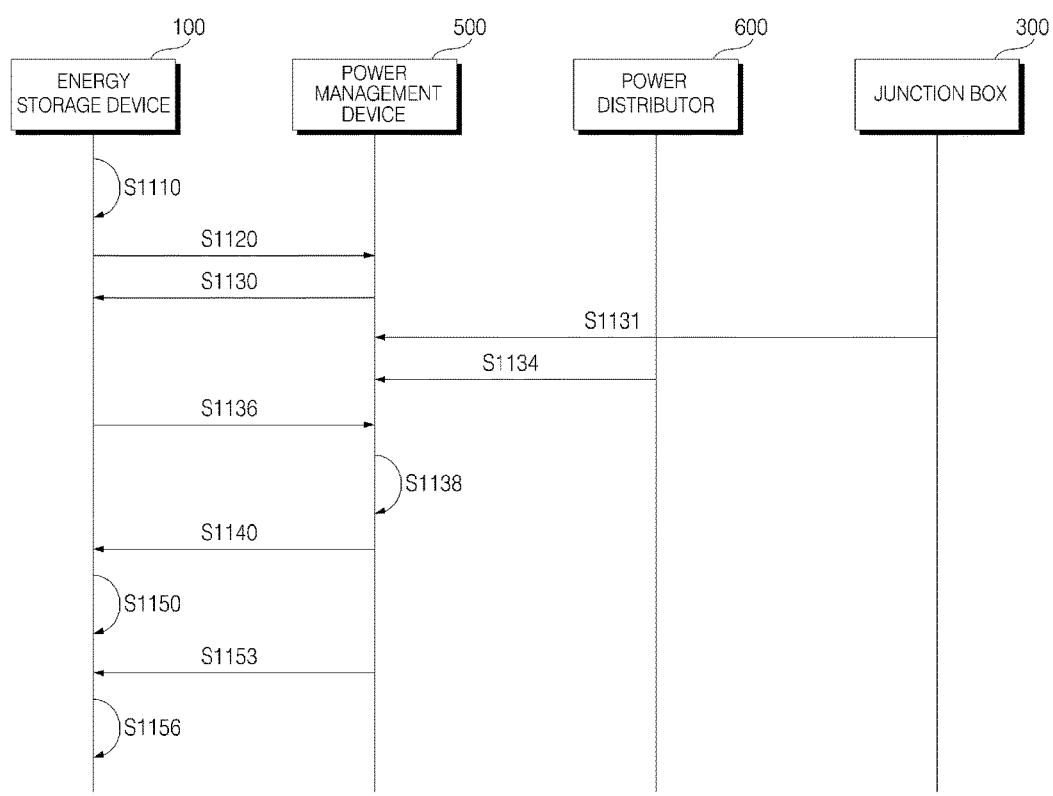
FIGS. 11 to 17 are views referred to for description of the operating method of FIG. 9 or 10.

On the other hand, step S1110 of FIG. 11 corresponds to step S910 of FIG. 9, step S1120 of FIG. 11 corresponds to step S920 of FIG. 9 and step S1020 of FIG. 10, and step S1130 of FIG. 11 corresponds to step S930 of FIG. 9 and step S1030 of FIG. 10.

Next, the power management device 500 receives solar power information from the junction box 300 (S1031). Also, the power management device 500 receives information about load power consumed in the internal power network 50 and information about commercial power supplied to the internal power network 50 from the power distributor 820 (S1034). Also, the power management device 500 receives information about power stored in the energy storage device 100, namely, information about an energy storage amount of the energy storage device 100 (S1036). Then, the power management device 500 calculates power storable in the energy storage device 100 or power to be output from the energy storage device 100 based on at least one of the load power information, the commercial power information, the solar power information and the energy storage amount information (S1038). Then, the power management device 500 transmits a charge command or discharge command to the energy storage device 100 based on information about the calculated storable power or information about the calculated output power (S1040).

The communication module 530 of the power management device 500 may receive information about solar power generated by the photovoltaic module 200 and then converted by the junction box 300 from the junction box 300 through ZigBee communication.

On the other hand, the communication module 530 of the power management device 500 may receive the commercial power information and the load power information from the power distributor 820 through ZigBee communication.

The load power information may be transmitted from the power distributor 820. For example, provided that the power distributor 820 has a wattmeter which calculates the amount of power consumed in the internal power network 50, it will calculate load power through the wattmeter. Information about the load power calculated by the power distributor 820 may be transmitted to the power management device 500.

On the other hand, the communication module 530 of the power management device 500 may receive information about power additionally storable in each of the energy storage devices 100a, 100b, . . . , 100e, namely, information about an energy storage amount of each of the energy storage devices 100a, 100b, . . . , 100e from a corresponding one of the energy storage devices 100a, 100b, 100e through ZigBee communication.

Figure 12C:
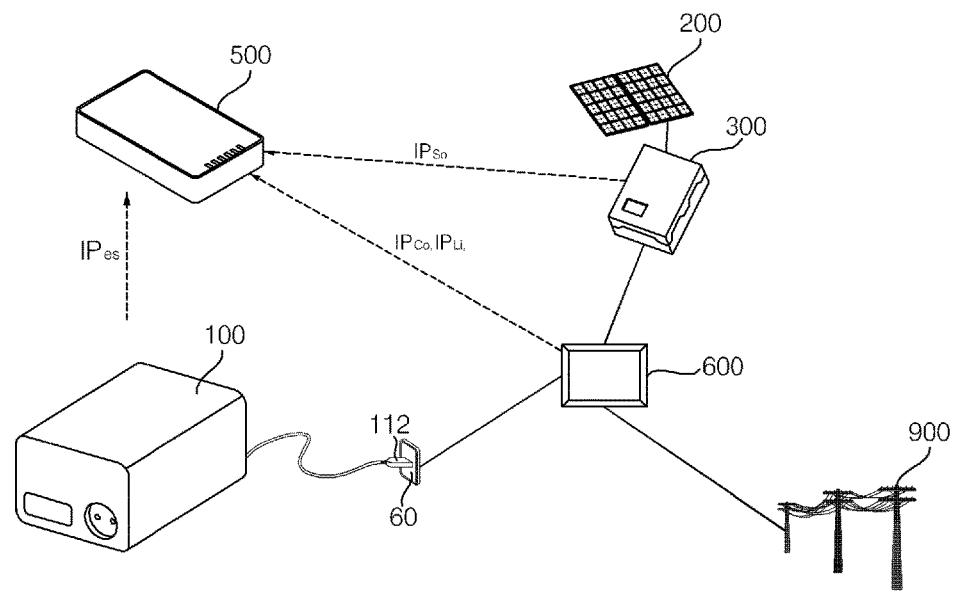

FIG. 12C illustrates that energy storage amount information IPes is transmitted from the energy storage device 100 to the power management device 500. Also, FIG. 12C illustrates that information IPso about solar power generated by the photovoltaic module 200 and then converted by the junction box 300 is transmitted from the junction box 300 to the power management device 500. Also, FIG. 12C illustrates that information IPco about commercial power supplied to the internal power network 50 and information $IP_L$ about load power consumed by each load are transmitted from the power distributor 820 to the power management device 500.

The processor 520 of the power management device 500 determines whether each of the energy storage devices 100a, 100b, . . . , 100e will operate in the charge mode or discharge mode, based on at least one of the received solar power information IPso, commercial power information IPco, load power information $IP_L$ and energy storage amount information IPes.

As an example, in the instance where information about solar power of a certain level or more is received from the junction box 300, the processor 520 of the power management device 500 may determine that the solar power will be supplied to the internal power network 50. Then, when the solar power is supplied to the internal power network 50, the processor 520 of the power management device 500 may determine that each of the energy storage devices 100a, 100b, . . . , 100e will operate in the charge mode.

As another example, in the instance where the energy storage devices 100a, 100b, . . . , 100e cannot be charged any more due to full charge thereof, the processor 520 of the power management device 500 may determine that the solar power will be supplied to the internal power network 50.

If it is determined that each of the energy storage devices 100a, 100b, . . . , 100e will operate in the charge mode, the processor 520 of the power management device 500 may calculate power to be stored in each of the energy storage devices 100a, 100b, . . . , 100e. Also, if it is determined that each of the energy storage devices 100a, 100b, . . . , 100e will operate in the discharge mode, the processor 520 may calculate power to be output from each of the energy storage devices 100a, 100b, . . . , 100e to the internal power network 50.

For example, all of the energy storage devices 100a, 100b, . . . , 100e may operate in the charge mode or discharge mode, or some of the energy storage devices 100a, 100b, 100e may operate in the charge mode and the others may operate in the discharge mode.

Here, information about the power to be stored may include at least one of a charge start command, charge time information and a charge stop command.

Also, information about the power to be output may include at least one of a discharge start command, discharge time information and a discharge stop command.

On the other hand, the communication module 530 of the power management device 500 may transmit the charge command to the corresponding energy storage devices in the charge mode. Also, the communication module 530 of the power management device 500 may transmit the discharge command to the corresponding energy storage devices in the discharge mode.

On the other hand, step S1131 of FIG. 11 corresponds to step S1031 of FIG. 10, step S1134 of FIG. 11 corresponds to step S1034 of FIG. 10, step S1136 of FIG. 11 corresponds to step S1036 of FIG. 10, step S1138 of FIG. 11 corresponds to step S1038 of FIG. 10, and step S1140 of FIG. 11 corresponds to step S940 of FIG. 9 and step S1040 of FIG. 10.

Next, the communication module 150 of the energy storage device 100 determines whether the charge command has been received from the power management device 500 (S940). If the charge command has been received from the power management device 500, the energy storage device 100 receives AC power from the internal power network 50 based on the received charge command, converts the received AC power into DC power and stores the converted DC power in the battery pack 160 (S950).

Figure 12D:
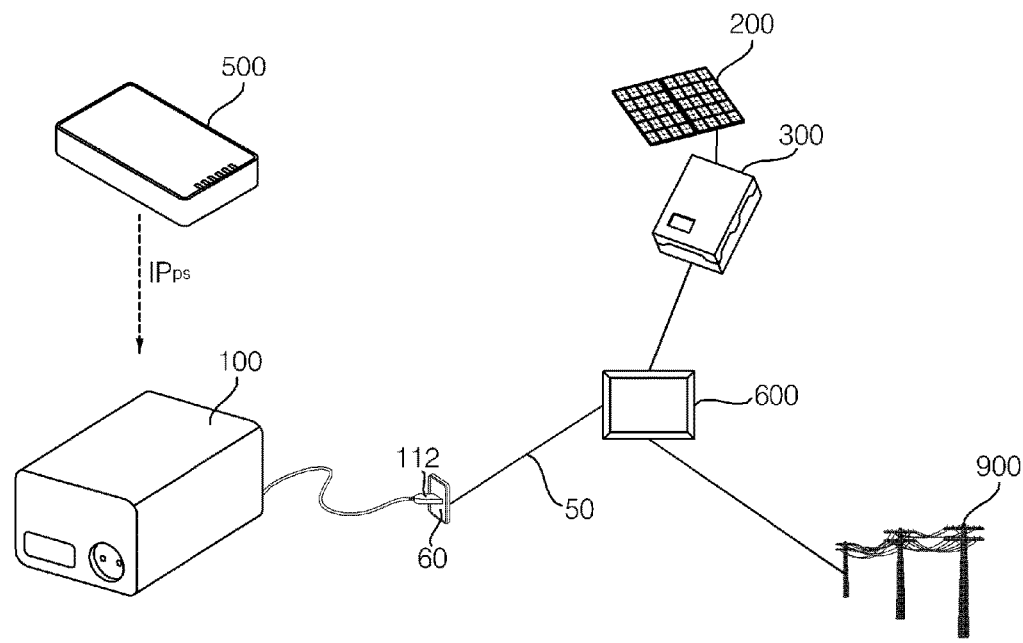

FIG. 12D illustrates that the charge command, denoted by IPps, is transmitted from the power management device 500 to the energy storage device 100.

Upon receiving the charge command IPps from the power management device 500, the communication module 150 of the energy storage device 100 may control the energy storage device 100 such that AC power from the internal power network 50 is input through the connector 130 and then converted into DC power by the power converter 140. Then, the communication module 150 may control the energy storage device 100 to store the converted DC power in the battery pack 160.

Therefore, the solar power supplied to the internal power network 50 may be simply stored in the battery pack 160.

Figure 12E:
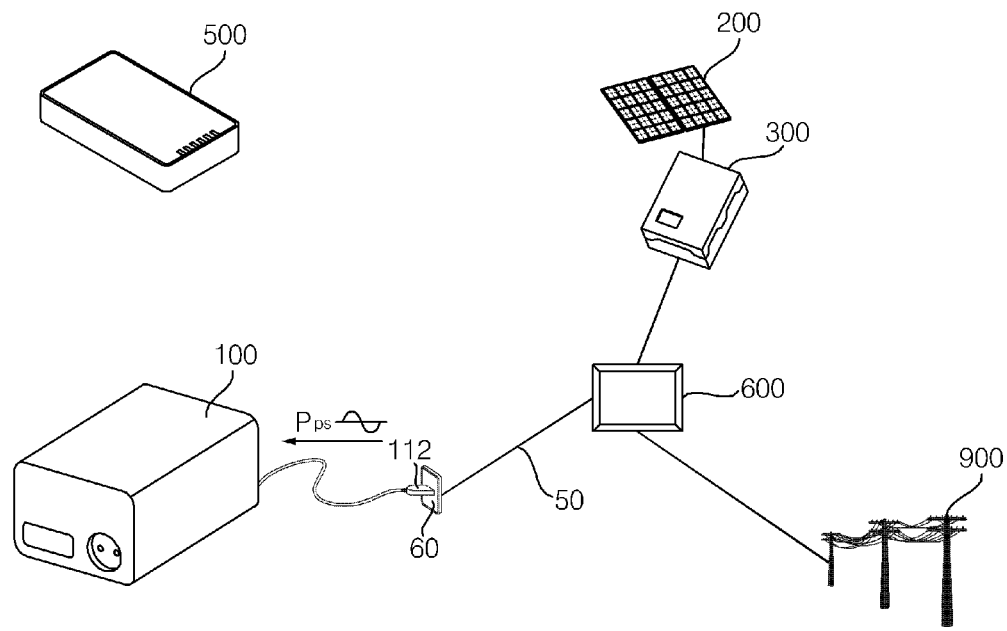

FIG. 12E illustrates that power Pps, namely AC power, corresponding to the charge command IPps is supplied from the internal power network 50 to the energy storage device 100.

On the other hand, step S1150 of FIG. 11 corresponds to step S950 of FIG. 9.

Next, the communication module 150 of the energy storage device 100 determines whether the charge stop command has been received from the power management device 500 (S953). If the charge stop command has been received from the power management device 500, the energy storage device 100 stops the input of the AC power from the internal power network 50 based on the received charge stop command (S956).

Therefore, the solar power supplied to the internal power network 50 may not be stored in the battery pack 160 any longer.

On the other hand, step S1153 and step S1156 of FIG. 11 correspond to step S953 and step S956 of FIG. 9, respectively.

Next, the communication module 150 of the energy storage device 100 determines whether the discharge command has been received from the power management device 500 (S960). If the discharge command has been received from the power management device 500, the energy storage device 100 converts DC power stored in the battery pack 160 into AC power based on the received discharge command and outputs the converted AC power to the internal power network 50 (S970).

Figure 12F:
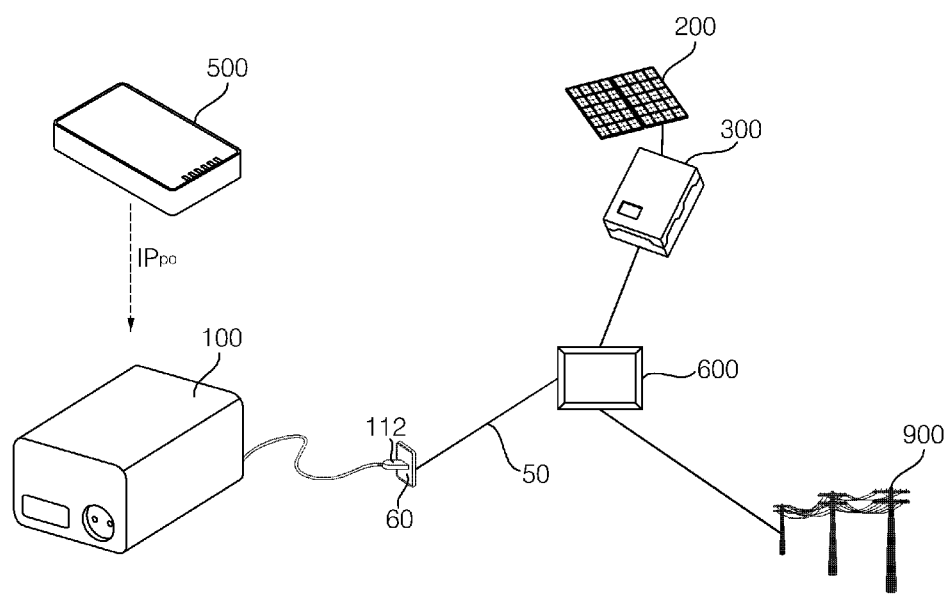

FIG. 12F illustrates that the discharge command, denoted by IPpo, is transmitted from the power management device 500 to the energy storage device 100.

Upon receiving the discharge command IPpo from the power management device 500, the communication module 150 of the energy storage device 100 may control the energy storage device 100 such that DC power stored in the battery pack 160 corresponding to the power to be output is supplied to the power converter 140. Then, the communication module 150 may control the energy storage device 100 such that the supplied DC power is converted into AC power by the power converter 140. Therefore, the DC power stored in the battery pack 160 may be simply converted and then supplied to the internal power network 50.

Figure 12G:
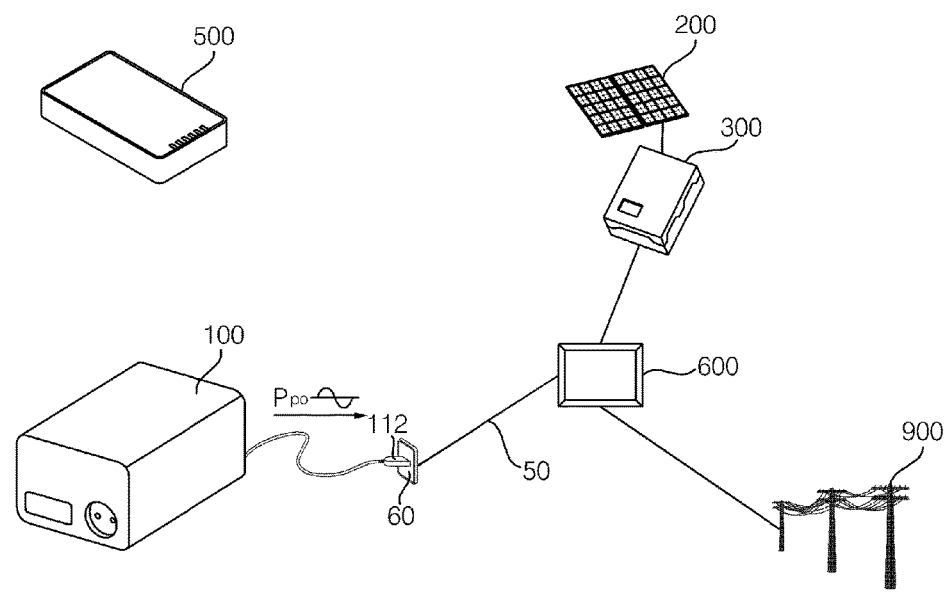

FIG. 12G illustrates that power Ppo, namely AC power, corresponding to the discharge command IPpo is supplied from the energy storage device 100 to the internal power network 50.

Next, the communication module 150 of the energy storage device 100 determines whether the discharge stop command has been received from the power management device 500 (S973). If the discharge stop command has been received from the power management device 500, the energy storage device 100 stops the output of the AC power to the internal power network 50 based on the received discharge stop command (S976).

Therefore, the DC power stored in the battery pack 160 is no longer supplied to the internal power network 50.

In this manner, power stored in the energy storage device 100 is supplied to the internal power network 50, thereby reducing consumption of commercial AC power. That is, renewable energy, such as solar power from the photovoltaic module 200, is stored in the energy storage device 100 and then supplied to the internal power network 50, so that the energy may be efficiently consumed. Also, because the consumption of the commercial AC power is reduced, the cost thereof is thus reduced.

On the other hand, whenever an energy storage device is added or removed, the power management device 500 may recognize the energy storage device addition or removal, receive information about the added or removed energy storage device and update the existing information with the received information.

As stated above, when an added energy storage device is powered on, the power management device 500 may perform pairing, etc., with the added energy storage device to newly store information about the added energy storage device, and allocate a radio channel for wireless data communication to the added energy storage device.

Conversely, when an existing energy storage device is powered off, a radio channel in use is not available. As a result, the power management device 500 may recognize that the existing energy storage device corresponding to the radio channel has been powered off, and update information about the powered-off energy storage device.

On the other hand, the power management device 500 may perform a control operation based on information about solar power generated by the photovoltaic module 200, information about commercial power supplied to the internal power network 50, information about load power consumed in the internal power network 50, etc., such that the commercial power is used at the minimum and the solar power is used at the maximum. That is, the power management device 500 may provide corresponding information to the power distributor 820 such that all of the solar power is supplied to the internal power network 50, and provide corresponding information to the power distributor 820 such that only a minimum amount of the commercial power is supplied to the internal power network 50 in consideration of the internal load power information.

On the other hand, the power management device 500 may provide a smart grid service. That is, in the instance where the price of the commercial power is different according to time zones, the power management device 500 may perform a control operation such that the commercial power is supplied to the internal power network 50 at a time zone at which the commercial power is cheap. Also, the power management device 500 may perform a control operation such that the commercial power supplied to the internal power network 50 is stored in each energy storage device.

As another example, the power management device 500 may perform a control operation such that power stored in an energy storage device is supplied to the internal power network 50 at a time zone at which the commercial power is expensive.

On the other hand, commercial power price information may be transmitted from the external server 570 to the power management device 500 or transmitted to the power management device 500 through the power exchange 800 or power distributor 820.

FIGS. 13A to 13E correspond to FIGS. 12C to 12G, respectively, with the difference that the power management device 500 receives or transmits information from or to a plurality of energy storage devices.

Figure 13A:
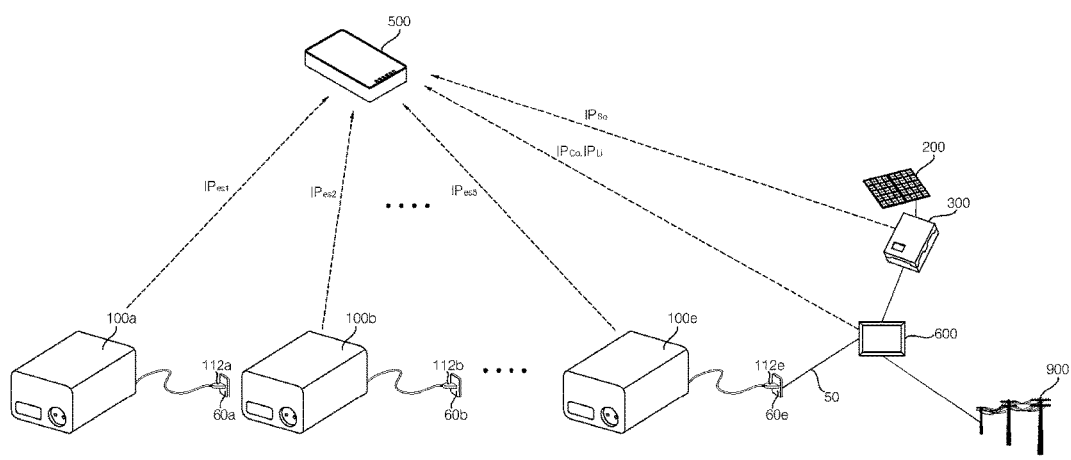

That is, FIG. 13A illustrates that energy storage amount information IPes1, IPes2, ..., IPes5 are transmitted from the respective energy storage devices 100a, 100b, ..., 100e to the power management device 500. Also, FIG. 13A illustrates that information IPso about solar power generated by the photovoltaic module 200 is transmitted from the junction box 300 to the power management device 500 and information IPco about commercial power supplied to the internal power network 50 and information $IP_L$ about load power consumed by each load are transmitted from the power distributor 820 to the power management device 500.

Figure 13B:
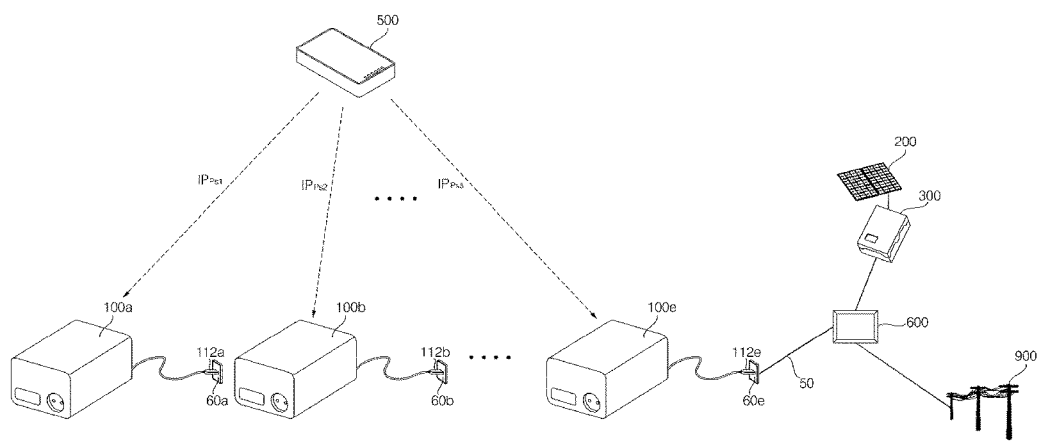

FIG. 13B illustrates that charge commands IPps1, IPps2, ..., IPps5 are transmitted from the power management device 500 to the respective energy storage devices 100a, 100b, ..., 100e.

Figure 13C:
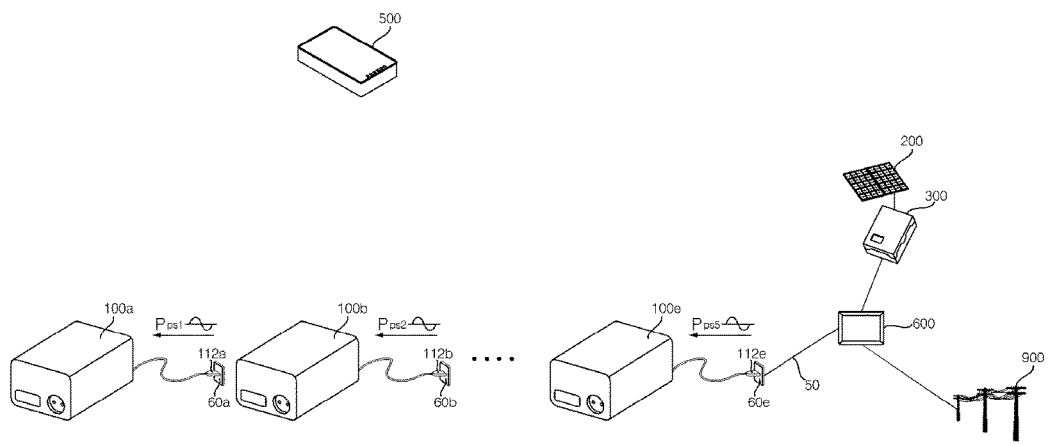

FIG. 13C illustrates that powers Pps1, Pps2, ..., Pps5, namely AC powers, corresponding respectively to the charge commands IPps1, IPps2, ..., IPps5 are supplied from the internal power network 50 to the respective energy storage devices 100a, 100b, ..., 100e.

Figure 13D:
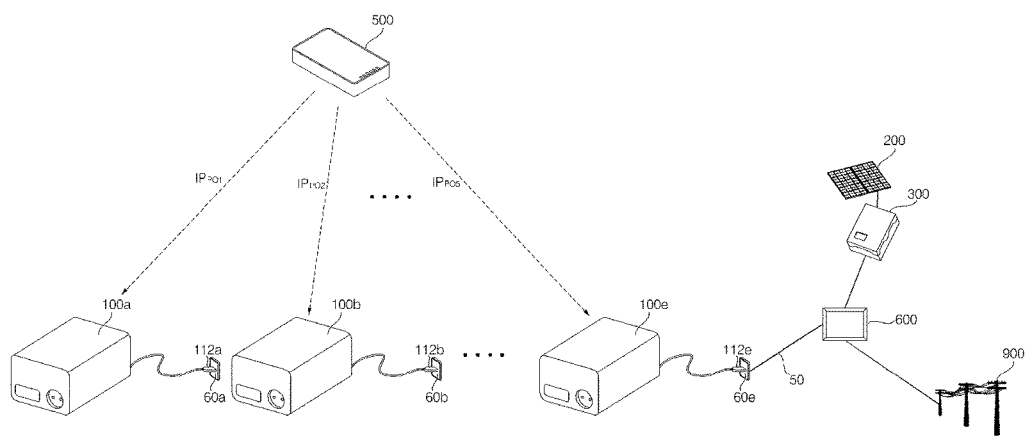

FIG. 13D illustrates that discharge commands IPpo1, IPpo2, ..., IPpo5 are transmitted from the power management device 500 to the respective energy storage devices 100a, 100b, ..., 100e.

Figure 13E:
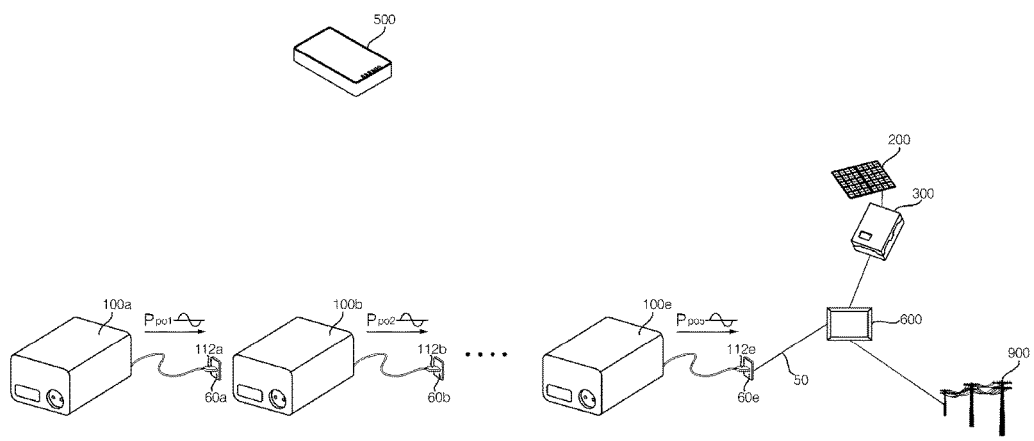

FIG. 13E illustrates that powers Ppo1, Ppo2, ..., Ppo5, namely AC powers, corresponding respectively to the discharge commands IPpo1, IPpo2, ..., IPpo5 are supplied from the respective energy storage devices 100a, 100b, ..., 100e to the internal power network 50.

On the other hand, all of the energy storage devices 100a, 100b, ..., 100e may operate in the charge mode as shown in FIG. 13C or in the discharge mode as shown in FIG. 13E. Alternatively, some of the energy storage devices 100a, 100b, ..., 100e may operate in the discharge mode and the others may operate in the charge mode.

Figure 13F:
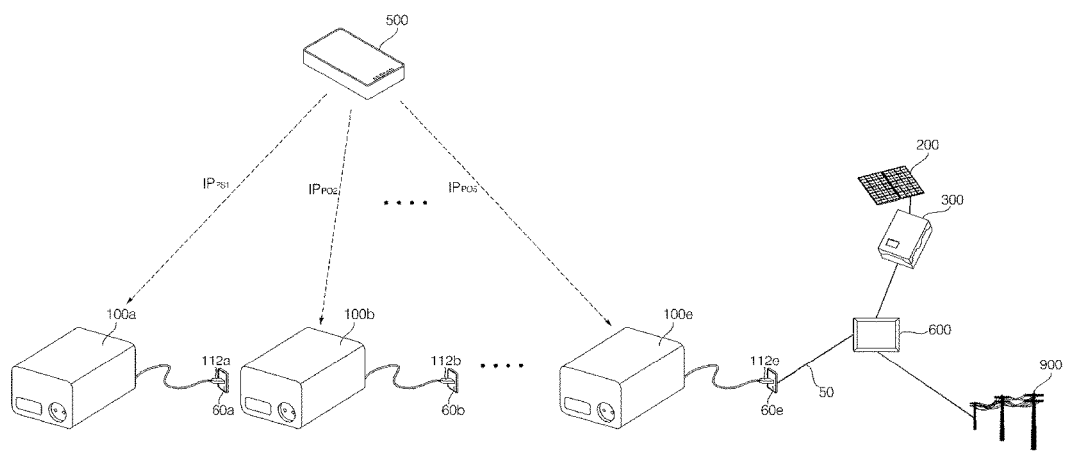

FIG. 13F illustrates that the charge command IPps1 and the discharge commands IPpo2, ..., IPpo5 are transmitted from the power management device 500 to the respective energy storage devices 100a, 100b, ..., 100e.

Figure 13G:
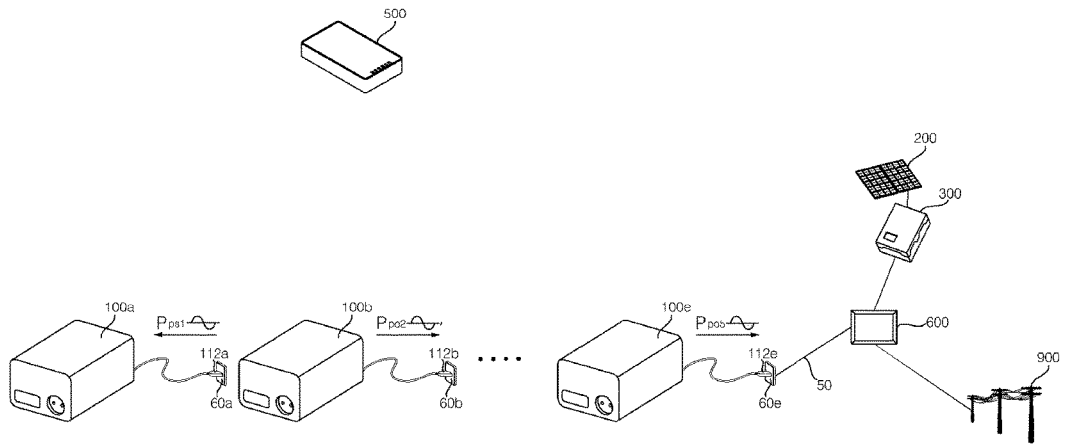

FIG. 13G illustrates that the power Pps1, namely AC power, corresponding to the charge command IPps1 is supplied from the internal power network 50 to the first energy storage device 100a. Also, FIG. 13G illustrates that the powers Ppo2, ..., Ppo5, namely AC powers, corresponding respectively to the discharge commands IPpo2, . . . , IPpo5 are supplied from the second to fifth energy storage devices 100a, 100b, . . . , 100e to the internal power network 50.

On the other hand, the power supply system 10 according to the present embodiment may supply some of the power stored in the energy storage device 100 to the power exchange 800 through the power distributor 820.

To this end, the processor 520 of the power management device 500 may calculate power to be output to the outside of the internal power network 50 based on at least one of the load power information $IP_L$, the commercial power information IPco, the solar power information Ipso and the energy storage amount information of each energy storage device. That is, the processor 520 may calculate external output power to be transmitted to the power exchange 800.

The communication module 530 of the power management device 500 may transmit information about the calculated external output power to the power distributor 820, which distributes the commercial power to the internal power network 50.

As a result, the energy storage device 100 may supply AC power to the internal power network 50 in the discharge mode, and the power distributor 820 may perform a control operation such that some of the AC power supplied to the internal power network 50 is output externally, particularly to the power exchange 800.

Figure 14A:
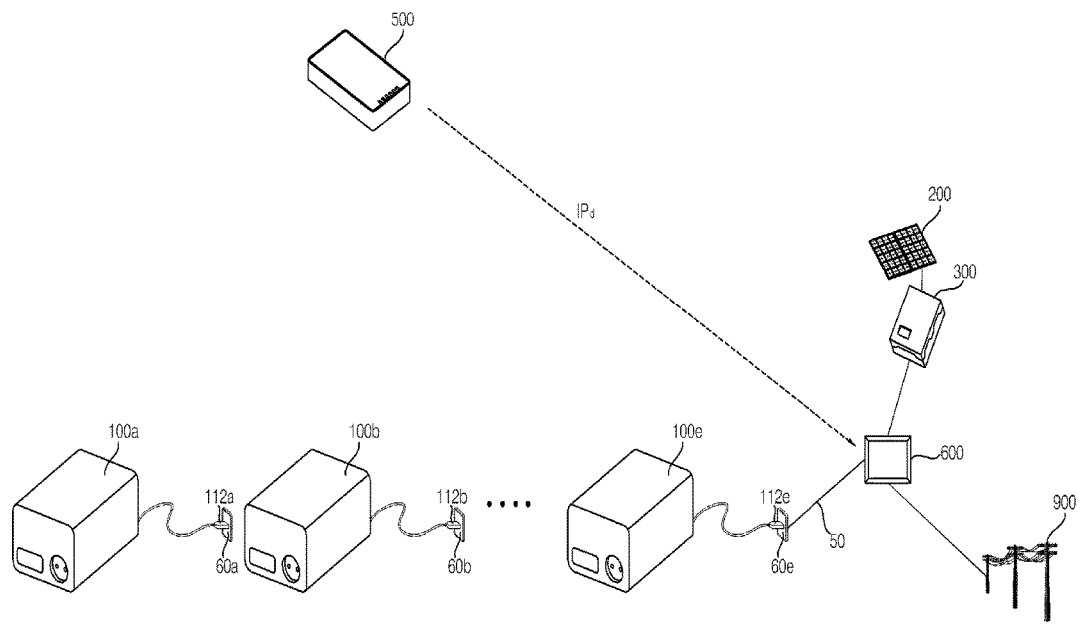

FIG. 14A illustrates that the external output power information, denoted by IPdi, is transmitted to the power distributor 820.

Figure 14B:
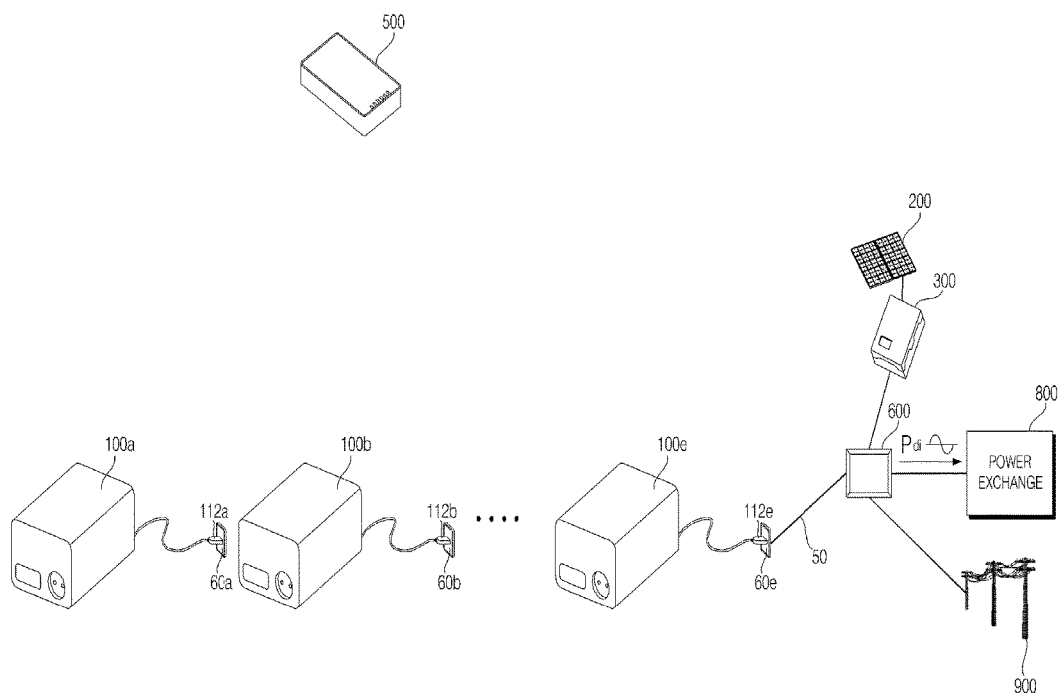
Figure 15A:
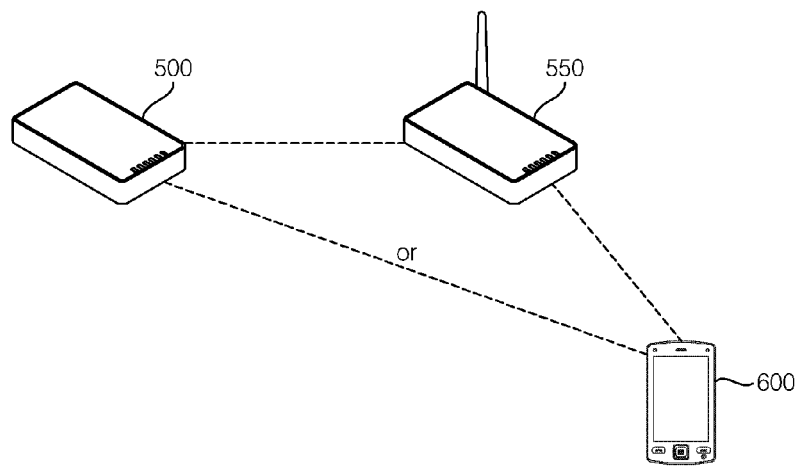
Figure 15B:
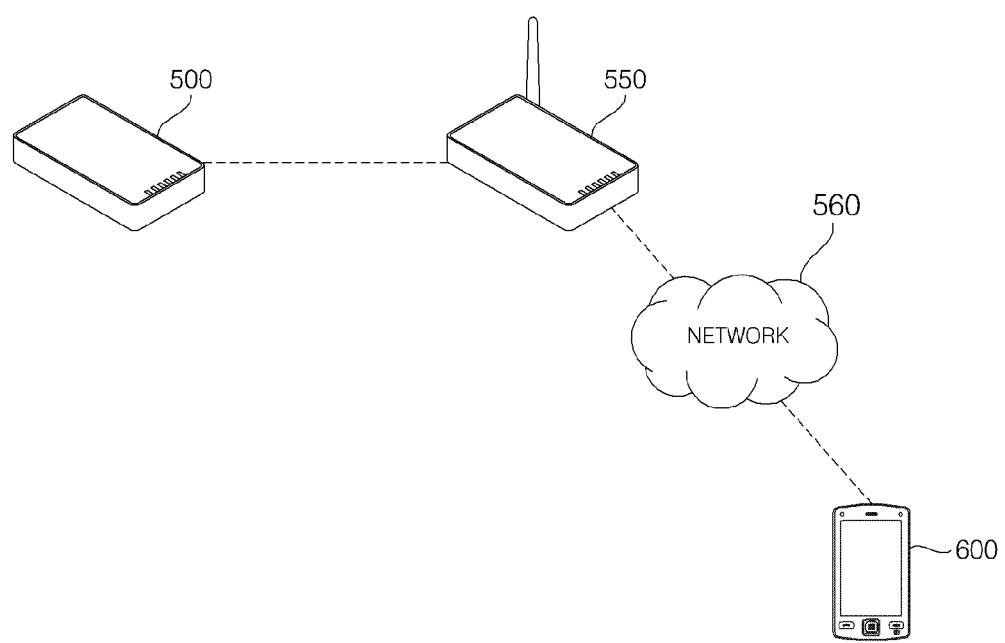

FIG. 14B illustrates that external output power Pdi, namely AC power, corresponding to the external output power information IPdi is transmitted from the power distributor 820 to the power exchange 800. Therefore, it may be possible to use power efficiently.

On the other hand, although the plurality of energy storage devices 100a, 100b, . . . , 100e and the plurality of loads 700a, 700b, . . . , 700e in the power supply system 10 according to the present embodiment are shown as one-to-one corresponding to each other, alternatively, a plurality of loads may be assigned to one energy storage device to correspond thereto. In particular, one energy storage device may correspond to loads adjacent thereto.

For example, one energy storage device may supply power stored therein to the internal power network 50 according to power consumption of a plurality of loads, and the corresponding loads may immediately consume AC power supplied from the energy storage device. That is, in the power supply system 10, an energy storage device corresponding to a local position where power consumption is required may operate in the discharge mode, thereby making it possible to efficiently manage power.

To this end, the power management device 500 may store information about the position of each energy storage device, information about the position of each load, and information about power consumption of each load.

The information about the position of each energy storage device may be calculated based on the strength of a signal, etc., when pairing with the corresponding energy storage device is performed. Also, the information about the position of each load may be calculated based on the strength of a signal, etc., when pairing between the corresponding load and the power management device 500 is performed.

Figure 16:
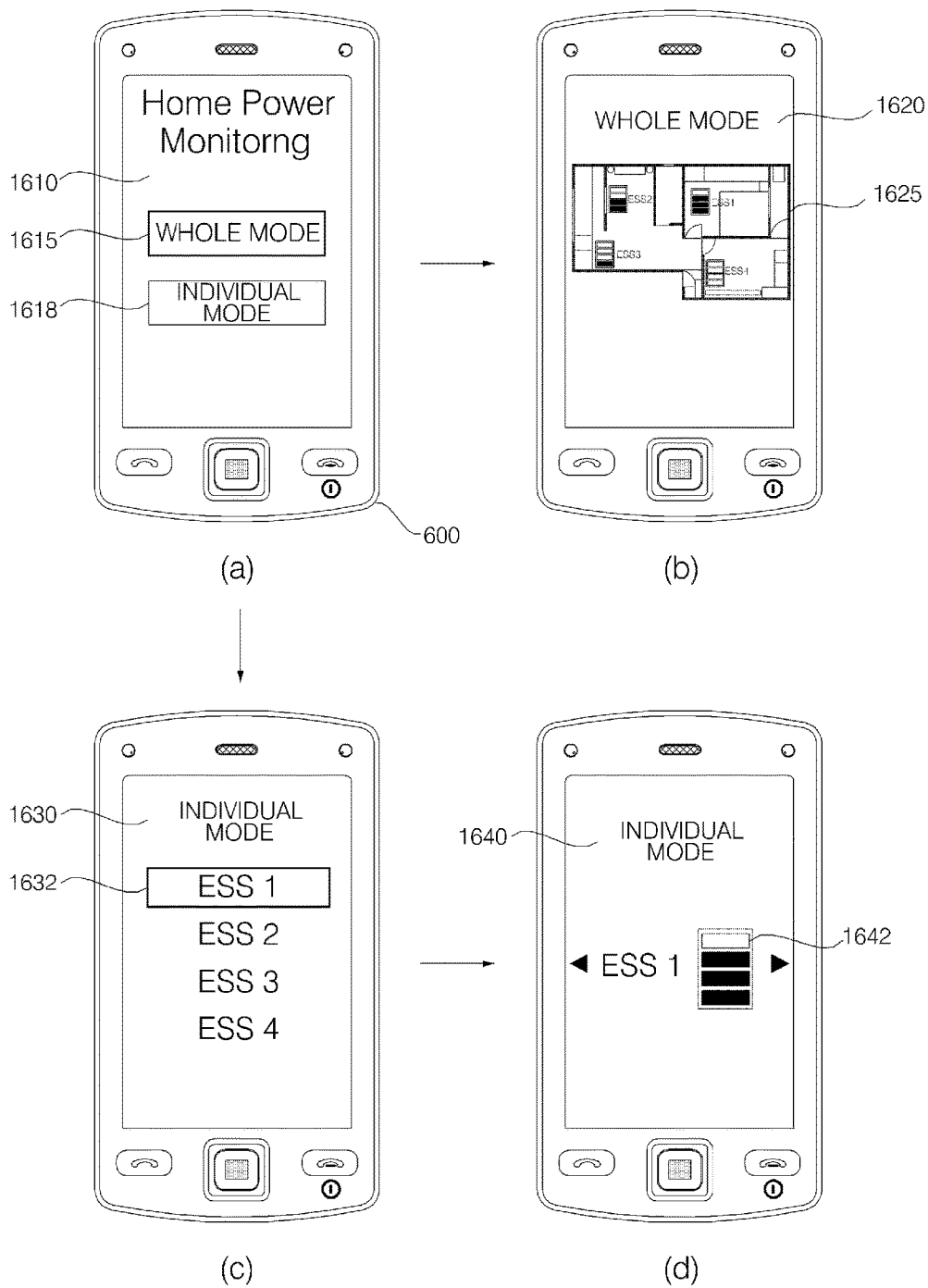
Figure 17:
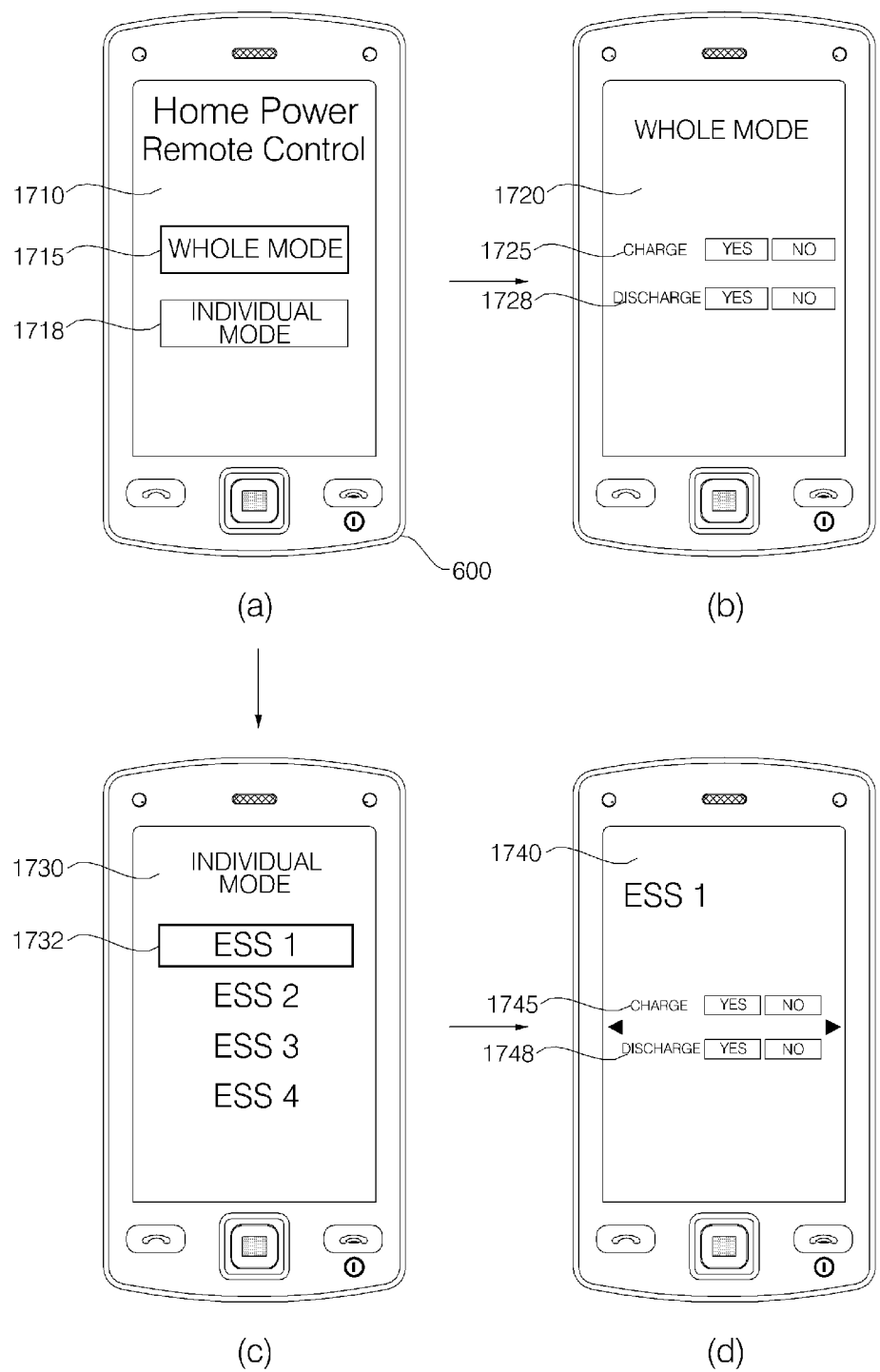

FIGS. 16 and 17 are views referred to for description of a power monitoring mode and a remote control mode through a mobile terminal.

FIG. 16 illustrates the power monitoring mode through the mobile terminal 600.

The mobile terminal 600 may enter the power monitoring mode for the internal power network 50 when an associated menu of the mobile terminal 600 is executed or an associated application of the mobile terminal 600 is run.

(a) of FIG. 16 illustrates a power monitoring picture 1610 displayed when the power monitoring mode is entered. The power monitoring picture 1610 is provided for monitoring of power in the internal power network 50, and is illustrated in the drawing as including a whole mode item 1615 and an individual mode item 1618.

In the instance where the whole mode item 1615 is selected, the wireless communication unit 610 of the mobile terminal 600 may transmit a power monitoring request to the power management device 500 over the internal network or external network 560. In particular, the wireless communication unit 610 may transmit a power monitoring request for the whole of the internal power network 50.

As a result, the power management device 500 may transmit monitored information for the whole of the internal power network 50, and the wireless communication unit 610 of the mobile terminal 600 may receive the transmitted monitored information and deliver the received monitored information to the controller 680. Then, the controller 680 may perform a control operation to display the monitored information in a whole mode through the display.

(b) of FIG. 16 illustrates a whole mode picture 1620. In particular, (b) of FIG. 16 illustrates that icons indicating energy storage amounts of energy storage devices ESS1, ESS2, ESS3 and ESS4 are displayed in a plan view 1625 of a house. Therefore, the user may intuitively check the energy storage amounts of the energy storage devices located in the house.

On the other hand, differently from the drawing, icons indicating energy consumption amounts of loads may further be displayed.

On the other hand, in the instance where the individual mode item 1618 is selected in (a) of FIG. 16, an individual mode picture 1630 may be displayed on the display of the mobile terminal 600, as shown in (c) of FIG. 16. In (c) of FIG. 16, the number of energy storage devices electrically connected to the internal power network 50 is illustrated as being four.

On the other hand, although the individual mode picture 1630 of (c) of FIG. 16 is illustrated as including only energy storage device items, it may further include load items, alternatively.

On the other hand, in the instance where a first energy storage device item 1632 is selected in the individual mode picture 1630 of (c) of FIG. 16, the wireless communication unit 610 of the mobile terminal 600 may transmit a power monitoring request for a first energy storage device to the power management device 500 over the internal network or external network 560. That is, the wireless communication unit 610 may transmit request information about an energy storage amount of the first energy storage device.

As a result, the power management device 500 may transmit the information about the energy storage amount of the first energy storage device as monitored information, and the wireless communication unit 610 of the mobile terminal 600 may receive the transmitted monitored information and deliver the received monitored information to the controller 680. Then, the controller 680 may perform a control operation to display the monitored information through the display.

(d) of FIG. 16 illustrates an individual mode picture 1640. In particular, (d) of FIG. 16 illustrates that an object 1642 indicating the energy storage amount information of the first energy storage device is displayed.

Therefore, the user may intuitively check the energy storage amount of the first energy storage device located in the house.

FIG. 17 illustrates the remote control mode through the mobile terminal 600.

The mobile terminal 600 may enter the remote control mode for the internal power network 50 when an associated menu of the mobile terminal 600 is executed or an associated application of the mobile terminal 600 is run.

(a) of FIG. 17 illustrates a remote control picture 1710 displayed when the remote control mode is entered. The remote control picture 1710 is provided for remote control of the power management device 500, etc., and is illustrated in the drawing as including a whole mode item 1715 and an individual mode item 1718.

In the instance where the whole mode item 1715 is selected, a whole mode picture 1720 may be displayed as shown in (b) of FIG. 17. The whole mode picture 1720 may include a charge item 1725 for charging of all of a plurality of energy storage devices electrically connected to the internal power network 50, and a discharge item 1728 for discharging of all of the energy storage devices.

For example, in the instance where "YES" of the charge item 1725 is selected, the wireless communication unit 610 of the mobile terminal 600 may transmit a remote control signal, which instructs the power management device 500 to charge all the energy storage devices, to the power management device 500 over the internal network or external network 560.

On the other hand, in the instance where the individual mode item 1718 is selected in (a) of FIG. 17, an individual mode picture 1730 may be displayed on the display of the mobile terminal 600, as shown in (c) of FIG. 17. In (c) of FIG. 17, the number of energy storage devices electrically connected to the internal power network 50 is illustrated as being four.

On the other hand, although the individual mode picture 1730 of (c) of FIG. 17 is illustrated as including only energy storage device items, it may further include load items, alternatively.

On the other hand, in the instance where a first energy storage device item 1732 is selected in the individual mode picture 1730 of (c) of FIG. 17, a remote control picture 1740 for a first energy storage device ESS1 may be displayed as shown in (d) of FIG. 17. The remote control picture 1740 may include a charge item 1745 for charging of the first energy storage device ESS1, and a discharge item 1748 for discharging of the first energy storage device ESS1.

For example, in the instance where "YES" of the charge item 1745 is selected, the wireless communication unit 610 of the mobile terminal 600 may transmit a remote control signal, which instructs the power management device 500 to charge the first energy storage device ESS1, to the power management device 500 over the internal network or external network 560.

Therefore, the user may remotely control the power management device 500 or energy storage device simply and conveniently.

The energy storage device, the power management device, the mobile terminal and the method for operating the same according to the present invention are not limited to the configurations and methods of the above-described embodiments, and all or some of these embodiments may be selectively combined and configured so that those embodiments may be subjected to various modifications.

On the other hand, the energy storage device operating method or power management device operating method of the embodiment of the present invention may be implemented in a recording medium readable by the processor of the energy storage device or power management device by processor-readable codes. The processor-readable recording medium may include all types of recording units in which processor-readable data may be stored. For example, the processor-readable recording medium may include a ROM, a RAM, a CD-ROM, a magnetic tape, a floppy disk, an optical data storage, or the like. Also, the processor-readable recording medium may be distributed to networked computer systems and processor-readable codes may be stored and executed in the computer systems in a distributed manner.

As is apparent from the above description, according to an embodiment of the present invention, an energy storage device may, based on a charge command or discharge command received from a power management device, convert AC power from an internal power network into DC power and store the converted DC power, or convert DC power stored therein into AC power and output the converted AC power to the internal power network. Therefore, it may be possible to efficiently store energy in the energy storage device.

In particular, a power converter of the energy storage device includes a bidirectional converter for receiving AC power and converting the received AC power into DC power, or converting DC power stored in a battery pack into AC power and outputting the converted AC power. As a result, the power converter requires no separate DC/DC converter, so that it may be simply configured.

Also, when the energy storage device is powered on, it may perform pairing with the power management device to operate under control of the power management device, thereby increasing user convenience.

On the other hand, when an energy storage device is powered on, the power management device may perform pairing with the powered-on energy storage device, thereby simply controlling energy storage devices provided in the same internal power network.

On the other hand, the power management device may allocate different radio channels to a plurality of energy storage devices, so as to efficiently control the respective energy storage devices.

Also, the power management device may generate a charge command or discharge command based on at least one of information about solar power generated by a photovoltaic module, information about commercial power supplied to the internal power network, information about load power consumed in the internal power network and information about an energy storage amount of an energy storage device, and transmit the generated charge command or discharge command to the energy storage device. Therefore, the power management device may efficiently control energy storage devices connected to the internal power network.

On the other hand, the power management device may calculate power to be output to the outside of the internal power network based on at least one of the information about the solar power generated by the photovoltaic module, the information about the commercial power supplied to the internal power network, the information about the load power consumed in the internal power network and the information about the energy storage amount of the energy storage device, and transmit information about the calculated output power to a power distributor connected to the internal power network, so as to control the power distributor such that the corresponding power is externally output.

Although the example embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An energy storage device comprising:
   at least one battery pack;
   a communication module connected to the at least one battery pack, and configured to transmit power-on information or energy storage amount information to a power management device and to receive a charge command or a discharge command from the power management device;
   a connector configured to receive alternating current (AC) power, supplied to an internal power network through a photovoltaic module, from the internal power network based on the charge command or to output AC power to the internal power network based on the discharge command; and
   a power converter disposed between the connector and the at least one battery pack, and configured to, when the charge command is received from the power management device, convert the AC power from the internal power network into direct current (DC) power based on the charge command, or, when the discharge command is received from the power management device, convert DC power stored in the at least one battery pack into AC power based on the discharge command,
   wherein the communication module transmits a pairing request signal as the power-on information to the power management device when the energy storage device is powered on, and then receives a pairing response signal including information about a radio channel allocated by the power management device from the power management device, and performs wireless data communication with the power management device over a radio channel different from that of another energy storage device, and
   wherein after paring completion, the communication module receives the charge command or the discharge command from the power management device, and transmits energy storage amount information of energy stored in the at least one battery pack to the power management device.

2. The energy storage device according to claim 1, wherein the communication module controls the at least one battery pack and the power converter.

3. The energy storage device according to claim 1, wherein the power converter comprises a bidirectional converter configured to convert the AC power from the internal power network into DC power or to convert the DC power stored in the at least one battery pack into AC power.

4. The energy storage device according to claim 1, wherein the power converter converts the DC power stored in the at least one battery pack into AC power when supply of commercial AC power to the internal power network is interrupted, and
   wherein the connector outputs the converted AC power to the internal power network.

5. The energy storage device according to claim 1, further comprising a pluggable socket.

6. The energy storage device according to claim 5, wherein the socket is connected with a plug of another energy storage device to change a DC power storage capacity of the energy storage device.

7. The energy storage device according to claim 1, wherein the communication module receives the charge command or discharge command over a radio channel different from that of another energy storage device.

8. A mobile terminal comprising:
   a display;
   a wireless communication unit configured to exchange data with a power management device; and
   a controller connected to the display and the wireless communication unit, and configured to, when a power monitoring mode for an internal power network is entered, perform a control operation to transmit a power monitoring request to the power management device, and, when monitored information for power information in the internal power network is received from the power management device, perform a control operation to display the monitored information on the display,
   wherein when the power monitoring mode is entered, a power monitoring picture including a whole mode item and an individual mode item is displayed,
   wherein when the whole mode item is selected, a whole mode picture including icons indicating energy storage amounts of a plurality of energy storage devices is displayed, and
   wherein when the individual mode item is selected, an individual mode picture is displayed, and when a first energy storage device item of the individual mode picture is selected, an object indicating energy storage amount information of a first energy storage device is displayed.

9. A method for operating a mobile terminal, the method comprising:
   entering a power monitoring mode for an internal power network;
   transmitting a power monitoring request to a power management device in the power monitoring mode;
   receiving monitored information for power information in the internal power network from the power management device; and
   displaying the monitored information on a display,
   wherein when the power monitoring mode is entered, a power monitoring picture including a whole mode item and an individual mode item is displayed,
   wherein when the whole mode item is selected, a whole mode picture including icons indicating energy storage amounts of a plurality of energy storage devices is displayed, and
   wherein when the individual mode item is selected, an individual mode picture is displayed, and when a first energy storage device item of the individual mode picture is selected, an object indicating energy storage amount information of a first energy storage device is displayed.

* * * * *